(12) United States Patent
Priestley

(10) Patent No.: US 10,855,771 B1
(45) Date of Patent: Dec. 1, 2020

(54) SYSTEMS AND METHODS FOR AD HOC DATA SHARING

(71) Applicant: Kolkin Corp., Newport Beach, CA (US)

(72) Inventor: Auron Priestley, Newport Beach, CA (US)

(73) Assignee: Kolkin Corp., Newport Beach, CA (US)

( * ) Notice: Subject to any disclaimer, the term of this patent is extended or adjusted under 35 U.S.C. 154(b) by 0 days.

(21) Appl. No.: 15/866,295

(22) Filed: Jan. 9, 2018

Related U.S. Application Data

(63) Continuation of application No. 14/265,209, filed on Apr. 29, 2014, now abandoned.

(60) Provisional application No. 61/817,121, filed on Apr. 29, 2013.

(51) Int. Cl.
*H04L 29/08* (2006.01)
*G06F 21/53* (2013.01)
*H04L 29/06* (2006.01)
*H04L 12/18* (2006.01)

(52) U.S. Cl.
CPC .............. *H04L 67/12* (2013.01); *G06F 21/53* (2013.01); *H04L 12/1818* (2013.01); *H04L 12/1822* (2013.01); *H04L 65/4038* (2013.01)

(58) Field of Classification Search
CPC ............. H04L 12/1822; H04L 12/1818; H04L 65/4038; H04L 67/12; G06F 21/53
See application file for complete search history.

(56) References Cited

U.S. PATENT DOCUMENTS

| | | | |
|---|---|---|---|
| 7,712,086 | B2 | 5/2010 | Hughes |
| 8,091,084 | B1 | 1/2012 | Dobrovolskiy |
| 2003/0009603 | A1 | 1/2003 | Ruths |
| 2005/0210271 | A1 | 9/2005 | Chou |
| 2006/0075219 | A1 | 4/2006 | Callaghan |
| 2008/0005472 | A1 | 1/2008 | Khalidi |
| 2008/0114990 | A1 | 5/2008 | Hilbert |
| 2008/0126791 | A1 | 5/2008 | Weiner |
| 2008/0209327 | A1 | 8/2008 | Drucker |
| 2009/0083183 | A1 | 3/2009 | Rao |
| 2010/0146049 | A1 | 6/2010 | Smychliaev |
| 2011/0055329 | A1 | 3/2011 | Abt, Jr. |
| 2011/0238618 | A1 | 9/2011 | Valdiserri |
| 2011/0313786 | A1 | 12/2011 | Fishman |
| 2012/0231441 | A1 | 9/2012 | Parthasarathy |
| 2013/0067121 | A1 | 3/2013 | Beel |

(Continued)

*Primary Examiner* — Abdulkader M Alriyashi
(74) *Attorney, Agent, or Firm* — Knobbe, Martens, Olson & Bear LLP

(57) ABSTRACT

Embodiments of ad hoc data sharing systems and methods for ad hoc sharing of data are disclosed. In some embodiments, a data sharing system enables an individual to administer ad hoc, real-time or near real-time direct private sharing of mission critical information between authorized team members separated by time and space. This can enable real-time collaboration between all team members over a computer network, which can incorporate the redundancy of multiple real-time human evaluations by several team members to prevent miscommunication errors and facilitate quality assurance of mission critical data. An individual who serves as an administrator of the data sharing system does not need to have technical knowledge of computers, which may be particularly advantageous in case of sharing medical data by medical professionals.

20 Claims, 26 Drawing Sheets

(56) References Cited

U.S. PATENT DOCUMENTS

2013/0111336 A1 5/2013 Dorman
2013/0173627 A1 7/2013 Apte

900

902 → 10.0.95.127

| List | New Patient | Consult | Search |
| 912 | 914 | 916 | 918 |

962 search 922    New Article 924    Settings 930

General Surgery ▽ 940

| Room | Patient | Dates | Diagnosis | Procedure | Medication | Labs/Imaging | Precautions | Plan |
|---|---|---|---|---|---|---|---|---|
| 424 | John Doe 012345 Smith, Joe | 61 M 08/09/13 | small bowel obstruction | 4/6 right hemicolectomy with small bowel resection | | | NPO; full code | clears? |
| 432 | Jane Doe 123456 Jones, Bob | 45 F 01/05/14 | right breast mass | 8/11 core needle biopsy | | | | f/u mammography |

966

950

Blood Bank 6789
Pharmacy 7890
964

Tue Noon: "round table"
Call area outside code #012345
Call Room Rm 1-6, Code #1234
Computer Room Code #4667

OR.schedule/hospital.url/or.schedule
http://hospital.url/oncall

960

Smith
P: 555-1212
H: 123-4567

OR Desk 1234
PRSch    2345
PreOp    3456
Lab      5678, 5679

*FIGURE 9*

| | | | | | | |
|---|---|---|---|---|---|---|
| ← → C | ⟲ | Q 10.0.95.127 | | | | |
| | List | New Patient | Consult | Search | | Settings |
| | 912 | 914 | 916 | 918 | | 930 |
| | | | | search | New Article | |
| | | | | 922 | 924 | |
| | | | | Save | Copy Admission | Delete Admission |
| | | | | 1222 | 1224 | 1226 |

| | |
|---|---|
| Team | General Surgery |
| Admission | 01/05/2014 15:05 ← 1210 |
| Discharge | |
| Medical Record | 123456 |
| Alias | |
| Gender | Female |
| Last Name | Doe |
| First Name | Jane |
| Age | 45 |
| Birth Date | 01/01/1969 |
| Diagnosis | right breast mass |
| Procedure | 8/11 core needle biopsy |
| History | 4 cm right outer quadrant non-tender breast mass found on physical exam by primary care physician |
| Problem List | |
| Diet | |
| Allergies | |
| Catheter(s) | |
| Precaution(s) | |
| Medication | |
| Labs/Imaging | |
| Plan | f/u mammography |
| Attending | Jones, Bob |
| Location | 432 |

Patient Summary Notes  ← 1230

Related Articles  ← 1240
Article 1
Article 2
...

| List | New Patient | Consult | Search |
| 912 | 914 | 916 | 918 |

← → ⟲ 🔍 10.0.95.127                                    search    New Article    Settings
                                                         922         924          930

User Profile: Joe Smith

| Save | Team Membership | Change Password |
| 1912 | 1914 | 1916 |

1920
| Photo | Choose File |
| Username | smithj |
| First Name | Joe |
| Last Name | Smith |
| Department | Surgery |
| Title | Surgeon |
| Contact Number | 1234 |
| Email | smithj@hospital.com |

*FIGURE 19B*

SYSTEMS AND METHODS FOR AD HOC DATA SHARING

CROSS REFERENCE TO RELATED APPLICATIONS

This application is a continuation of U.S. patent application Ser. No. 14/265,209, entitled "SYSTEMS AND METHODS FOR AD HOC DATA SHARING," filed on Apr. 29, 2014, which claims the benefit under 35 U.S.C. § 119(e) to U.S. Provisional Patent Application No. 61/817,121, entitled "AN AUTOMATED AND SECURED TEAM BASED DATA NETWORKING METHOD AND SYSTEM," filed on Apr. 29, 2013; the disclosures of which are hereby incorporated by reference in their entirety.

BACKGROUND

Technical Field

This disclosure relates to electronic data management and ad hoc data sharing, specifically the generation, transfer, editing, access, storage, and sharing of electronic information via creation of a private, secure network.

Description of the Related Art

Data sharing permeates almost every aspect of modern life. In a professional setting, there often arises the need to share data with coworkers, business partners, clients, etc. Likewise, in a personal setting, there often arises the need to share data with friends, family, etc. Data may be shared with persons who are located at remote locations from the data source. When data is shared, there often arises the need to maintain consistency of the data when the data is modified by multiple persons.

For example, in a hospital setting medical data often needs to be shared among medical personnel, such as doctors, nurses, pharmacists, billing staff, and the like, as the practice of medicine involves a high paced dynamic environment. Patient treatment may occur locally or remotely in wide variety of settings. In order for teams of professionals to coordinate and communicate fluidly at unpredictable critical moments, a foundation of accurate, accessible and secure information must first be established. As such, accuracy, speed, versatility and security of information transfer have become cornerstone needs in the administration of quality medical care. These needs cannot be satisfactorily achieved without proper technological enablement. Accordingly, there exists a need for ad hoc data sharing systems and methods that are easy to use, efficient, and accurate.

SUMMARY

In some embodiments, a system for ad hoc collaboration, review, and accurate sharing of data between team members thereby improving quality assurance of mission critical information is provided. The system can include at least one processor configured to respond to receiving a plurality of requests from a plurality of remote users to join an ad hoc data sharing network being executed on the at least one processor by allowing at least some of the remote users to join the data sharing network, provide data to the remote users who joined the data sharing network, update data in response to receiving a request from a remote user who joined the data sharing network to modify at least part of the provided data, and provide updated data to the remote users who joined the data sharing network. Updated data can be provided substantially in real-time with receiving the request to modify at least part of the provided data.

In certain embodiments, a non-transitory computer readable medium includes instructions that, when executed on a computer having at least one processor that executes an operating system, cause the at least one processor to execute an ad hoc data sharing network, respond to receiving a plurality of requests from a plurality of remote users to join the ad hoc data sharing network by allowing at least some of the remote users to join the data sharing network, provide data to the remote users who joined the data sharing network, update data in response to receiving a request from a remote user who joined the data sharing network to modify at least part of the provided data, and provide updated data to the remote users who joined the data sharing network. Updated data can be provided substantially in real-time with receiving the request to modify at least part of the provided data In certain embodiments, a computer-implemented method for ad hoc collaboration, review, and accurate sharing of data between team members thereby improving quality assurance of information is provided. The method can include executing an ad hoc data sharing network, responding to receiving a plurality of requests from a plurality of remote users to join the ad hoc data sharing network by allowing at least some of the remote users to join the data sharing network, providing data to the remote users who joined the data sharing network, updating data in response to receiving a request from a remote user who joined the data sharing network to modify at least part of the provided data, and providing updated data to the remote users who joined the data sharing network. Updated data can be provided substantially in real-time with receiving the request to modify at least part of the provided data. The method can be performed by at least one processor.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

FIG. 9 illustrates an interface for sharing medical data.

FIG. 12 illustrates an interface for editing patient information.

FIG. 13 illustrates an interface for adding new patient information.

FIG. 15 illustrates an interface for searching medical data.

FIGS. 19A-19E illustrates interfaces for displaying and changing settings of a data sharing system.

DETAILED DESCRIPTION

Overview

Figure 1:
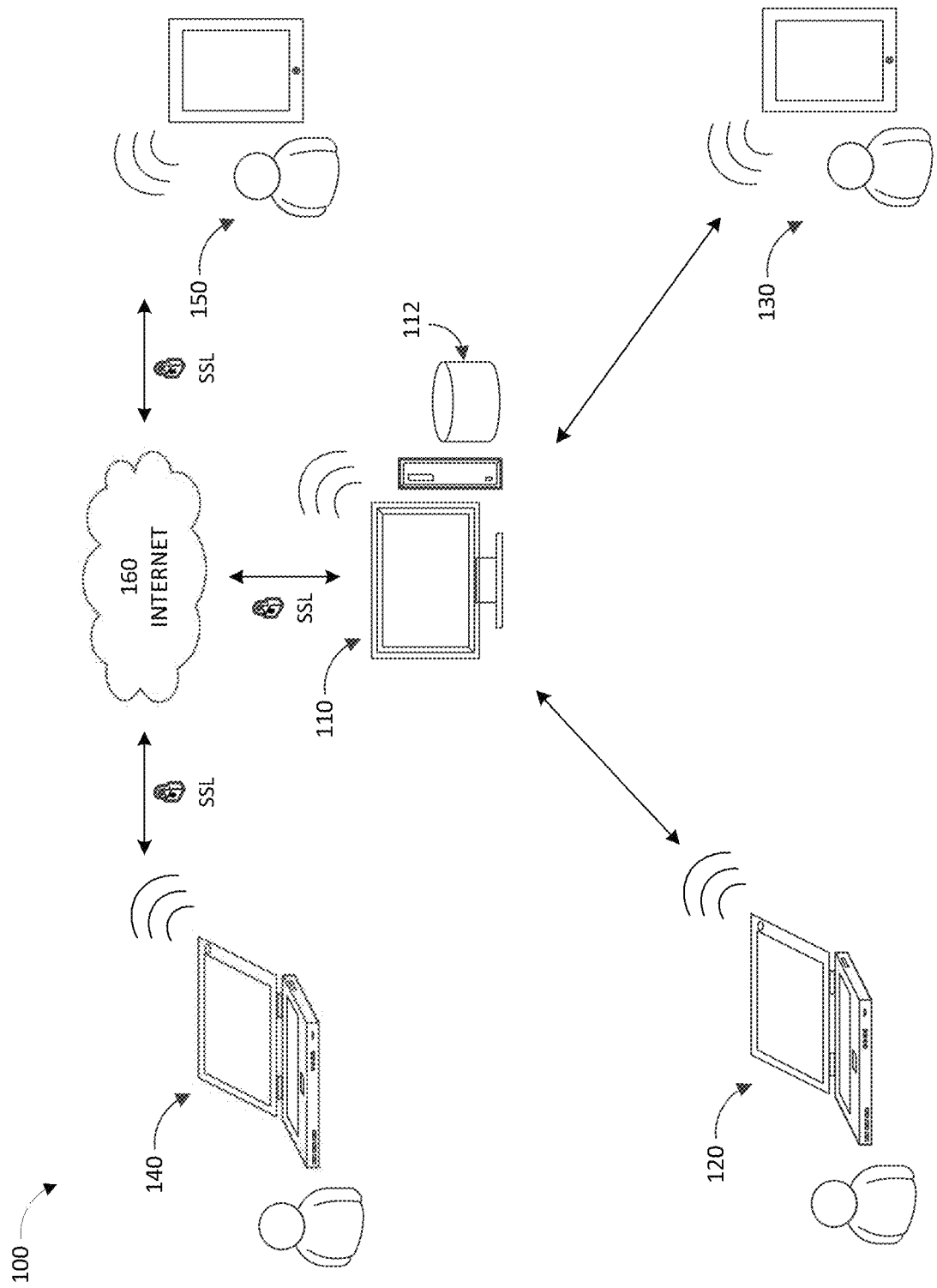
FIG. 1 illustrates an ad hoc data sharing system.

Prior to the advent of cloud computing technology, data to be shared among various remote users, such as medical data, was relegated to localized management within a particular facility, such as a medical facility, by expert teams of computer administrators. The flow of digitized information and manner of storage at the facility was developed by an in-house technology team. Authorizations, passwords, security, and housing of original information were solely within the local possession and control of such experts and the facility. Network access to such information was and still often is limited to the physical location of a database and the availability of administrative assistance. As such, data access was geographically localized due to lack of more enabling technology.

Current advances in technological areas of cloud computing and computer networking systems have allowed for improvements in the management and communication of electronic data, particularly with the field of medicine. New data management methods adopting cloud server systems have broadened the capability to share data over a wider network of users and operating systems. Remotely administered cloud data servers can allow the sharing of data over the internet from nearly any location, at any time, and between multiple operating devices. Some of such cloud administered data management systems provide versatility and flexibility. A variety of specialized cloud enabled systems have been devised to overcome data sharing needs, each system competing with the other for relevance to the end user.

Drawbacks however lie in the fact that third party administered networking systems involve separately owned and managed databases that typically cannot not be easily integrated with in-house databases. Remote networking through web communication routes information through a third party server and database. Internal network communication within a facility however routes information through the facility's in-house database. Typically, there is no interface that enables the sharing of information internally and externally through a common original database or server. For medical data, gaps in patient records are likely to result from this disparate manner of record keeping, thereby defeating the aim for accuracy in patient data management. For example, patient records may generally be maintained in paper format, which is inefficient and can lead to errors when patient care is handed off to a next team when the shift of a current team ends.

Further, cloud systems at their core are inherently unsecure because they involve third party administration as well as storage of data by a third party. By their own nature, presence of an unrelated third party administrator defeats complete privacy and security of information stored within the database. Further, storage of data by third party creates the potential for data breach. Although means for cloud encryption have been developed, risk to privacy is unalleviated so long as original information remains in the possession and control of third party server providers.

For example, in case of sharing of medical data, the lack of a truly integrating and standardized system for data sharing in a secure manner leaves a wide open door for risk of malpractice in the field of medicine if information is compromised. The high paced multifaceted work flow of medicine demands improved means for fast, accurate, secure and versatile transfer of information. Unlike systems that use hard-coded computer logic to prevent medical errors, an ideal system should be intuitive so as to encourage and facilitate continuity and fluidity of work flow.

Moreover, set up and integration of a cloud system is often challenging as it may require specialized computer knowledge. In addition, generally users need to obtain credentials from the cloud system administrator. Cloud systems often impose restrictions on sharing of data, such as file size restrictions, bandwidth restrictions, and the like.

Embodiments of ad hoc data sharing systems and methods for ad hoc sharing of data are disclosed. In some embodiments, a data sharing system enables an individual to administer ad hoc, real-time or near real-time direct private sharing of mission critical information between authorized team members separated by time and space. This can enable real-time collaboration between all team members over a computer network, which can incorporate the redundancy of multiple real-time human evaluations by several team members to prevent miscommunication errors and facilitate quality assurance of mission critical data. An individual who serves as an administrator of the data sharing system does not need to have technical knowledge of computers, which may be particularly advantageous in case of sharing medical data by medical professionals.

In some embodiments, a zero-configuration secure server, such as a web server, is used for ad hoc sharing of data. Unlike existing systems that generally require having extensive technical knowledge of computers and manual configuration of a server and database, the server works without any configuration (or with very little configuration) by the user or without administrator intervention. Rather, the user can copy the server files onto any personal computing device (or run the files from an external storage, such as a flash drive) and start the server and the database by, for example, simply clicking on the server application. No configuration is required. The server can run on any operating system and the entire setup of the server can be done through a point-and-click mouse interface (or its equivalent). For example, an executable file can run immediately when the file is clicked (e.g., zero configuration). Regardless of the operating system, the server can be configured to have the same behavior for set-up and execution.

In various embodiments, the data sharing system does not alter the underlying operating system of a personal computing device. For example, operating system parameters that are related to configuration of application programs, such as registry parameters in Windows, preferences in MacOS, configuration files in Linux, may not be modified. No installation of the system may be needed. Removing the system software may involve deleting the file directory in which the software resides.

In certain embodiments, the data sharing system includes a zero-configuration database. The database can be executed automatically when the server is executed without requiring any configuration (or with very little configuration) by the user or without administrator intervention. Like the server, the database can run on any operating system. The database can store information in an encrypted format, which may be particularly advantageous for confidential data, such as medical records, in case physical hardware is stolen or compromised. The system can provide for setup of the database and encryption of data stored in the database without user intervention. Moreover, data that is intended for sharing can be stored in the user's computer and shared with others without the need to store data on a third-party computer, such as in the cloud.

In some embodiments, remote users access the data sharing system using a web user interface that is standardized for all web browsers. Accordingly, remote users do not need to install any special software to access for data sharing. The user interface is uniform or substantially uniform regardless of operating system or browser platform used by a remote user. In certain embodiments, the data sharing system uses a set of web standards that are common to all web browsers. Administration of the data sharing system by a user who also acts as administrator can also be accomplished through web browser-based interface, which can also be standardized and uniform across operating system and web browser platforms. In some embodiments, unlike systems that provide virtualization of remote desktops, no data associated with desktop virtualization is transmitted to remote users, which can improve efficiency and bandwidth utilization.

In various embodiments, real-time or near real-time collaboration can be achieved. For example, in case of medical data, a team of medical providers can list the tasks that are needed to be completed for patients using one or more data lists. A data list can be viewed and updated by all team members in real-time using any computer device with a web browser. There are no applications that should be downloaded or installed for end users to participate in the sharing of data. This allows team members to be added in an ad hoc manner as authorized users by relying on self-administration nature of the data sharing system, which allows team administrators to validate authorized users.

In certain embodiments, a self-establishing data server system for sharing data through an internet or intranet is self-administering by simple clicking method through preconfigured software application. The application can automatically converts a host operating device, such as a personal computing device, into a secure host server and database system by the method of choosing preconfigured options through simple click methods. The self-administration of the server and database from the host operating device is further achieved through simple click process using a web browser interface. No prior knowledge of computer technology is required to establish and administer the private data sharing network server system.

In some embodiments, a method of establishing a privately hosted data server includes automatically reconfiguring any computing device to function as a server system. This reconfiguration process can be activated by simple selection or clicking method by the user. The method can also automatically install a database program on the computing device upon recognition of its absence. The database and server can be further configured to integrate a security identification code and or a server identification code for purpose of facilitating automatic network security management. The server can be accessible through a common web browser interface by any remote operating device, from any location, and from any type of web browser and web platform. A standardized web interface and access creates a uniform experience of network interaction and data sharing for multiple users no matter the point of access.

In certain embodiments, privately hosted data server system can be established by self-administered one-click method. The system can include the following elements: 1) said software components of the data server system, 2) a computing device capable of executing a database program, 3) the device having (or being attached to, if it is a portable data storage device, to a device having) a viewable web browser, and 4) a security encryption license (if secure data storage and communication are desired). A primary or administrative user who is attempting to initiate this system would begin by installing the software components into the computing device by a simple one-click process. The installation process would automatically reconfigure the device to function as a server, automatically install a database program if one is absent, and will automatically add security options to the server and database. The software installation process further creates and automatically delivers a web interface from an automatically prescribed local host address for immediate access between the host device and its host server and database. Upon delivery of the web interface, the user gains immediate access to its own database and server.

At this point, the user can select one of several network operation choices. The first option would be to limit server and database access only to the administrative device. Essentially, no network data sharing would be involved, and the installed software program would be relegated to purely personal use. In this case, security encryption may not be a serious concern for the user since the information would never be transferred beyond the computing device. Alternatively, data may be shared over an intranet system (or local network system) within a defined network facility without entering the outside world (e.g., the internet domain). The internal networking of multiple computer operating devices within a given facility may already be subject to internal security encryption and security protocol with likely no direct unfiltered link to the outside world. As such, the administrative user may not be concerned with the need for database and server encryption at this level of networking. Another option would be to enable remote access from the outside world (e.g., internet access). In some embodiments, an additional component of a host URL could enable internet access through a web browser interface. Secure encryption of the host database and server may be desired to preserve the integrity and privacy of shared data. Upon initial access to the software enabled web interface browser, the administrative user can choose the appropriate security setting for the choice networking option. For example, administrative user can enter (e.g., copy and paste) SSL certificate and key information for setting up a secure, encrypted connection. These choice options would dictate the level of security encryption for the network server.

In various embodiments, a method for administering a secure data networking system between local or remote network users can be implemented through preconfigured options by any user with minimal computer knowledge or experience. Upon establishing a secured host server system on a computing device and upon the creation of an administrative user profile, the administrator may begin the process of establishing a network of users or members (either primary or secondary users) to whom access is given. The administrative user can manually preview and verify the identity of a prospective user prior to authorizing secured access to said prospective user. Individuals interested in becoming a prospective secondary user of an established network can first create a user profile and transmit the profile to the computing device via a web interface. Administrative user can then review, verify, and authorize access on a case by case basis. Once a prospective user is granted access (thereby becoming an authorized secondary user), the user inherits enabled security functions, which results in automatic encryption and recordation of all information flowing to and from the secondary user. In some embodiments, two or more administrative users who are secondary users of each other's database, can copy and merge databases. Only users having this primary administrative control over their own server database may affect this level of manipulation over the database.

In certain embodiments, upon initial set up of the data sharing system, a unique identifier and encryption code are assigned to the system (and the database). Authorized secondary users having access can be assigned the identifier and security code in common with the database and administrative user or can be assigned individual identifier and security code. As such, all transmitted data from a user having an identifier and security code will further be associated with the user's identifier and code. As such, all transferred data can be associated with an identifier and security code in common with the database and data sharing system so that data transferred from any remote or local location and from any computing device may be accessible only by those having the same identifier and encryption code in common with the database and data sharing system. The encryption process can occur at the point of association with the data sharing system and a security code can be attached to the data as it is being generated or saved. Security encryption of the database secures all stored information, including user profiles and communications associated with each user.

In some embodiments, new information generated by an authorized user and saved in a particular database will inherit the identifier and security code of its server. As such, a closed loop encryption and decryption system is created that allows new information to be automatically encrypted and stored within the private database, while enabling automatic decryption of the database by any authorized network member. This can occur without any separate action by the user and can be based on matching the identifier and security code.

Ad Hoc Sharing of Data

FIG. 1 illustrates an ad hoc data sharing system 100 according to some embodiments. A computing device 110 can be configured to act as a server executing a data sharing system, network, or service and can further store data in data repository 112, which can be a database. The data repository 112 can be local to the computing device 110 (e.g., not be cloud storage) and can be encrypted for greater security. The computing device 110 can be any computing device, such as a personal computer (desktop or laptop), tablet, smartphone, dedicated server, and the like. The computing device 110 can execute a data sharing system. Remote users using remote computing devices 120, 130, 140, and 150 can be connected to the computing device 110 for the purposes of sharing data. Computing devices 120, 130, 140, and 150 can be any computing device, such as a personal computer (desktop or laptop), tablet, smartphone, and the like, running any suitable operating system, such as Windows, MacOS (or OS X), Linux, Unix, Windows CE, iOS, Android, and the like. Remote users using devices 120 and 130 can be connected using intranet to which the computing device 110 is connected. Remote users using devices 140 and 150 can be connected via Internet 160. The connection between the computing device 110 and remote devices 140 and 150 can be secure or encrypted, such as for example via using SSL protocol, TSL protocol, or any other suitable form of secure communication. Devices 120 and 130 may not use secure connection as they may be connected to the computing device 110 via local intranet. Any of the connections can be wired, wireless, or a combination of the two.

In some embodiments, the data sharing system can be configured to be executed on the computing device 110 requiring zero configuration (e.g., no or almost no configuration). For example, the data sharing system can include a set of software components that are stored on an external storage medium, such as a flash drive, or is downloaded to the computing device 110 from a remote computer. The user can copy the software components to the computing device 110 and click an executable software module, which in turn starts the data sharing system (and any associated database) without requiring any intervention from the user. In certain embodiments, no software components need to be copied to the computing device or be installed on the computing device in order to start the data sharing system (and any associated database). For example, a user can simply click on the executable software module that is stored on an external storage medium, such as a flash drive, in order to execute the data sharing system. In various embodiments, installation and starting of the data sharing system does not make any modifications to one or more configuration parameters of an operating system running on the computing device 110. The configuration parameters can be parameters associated with configuration or execution of software programs, and may be parameters stored in Windows registry, preferences in MacOS, configuration files in Linux, and the like. In some embodiments, the data sharing system can be uninstalled or removed by deleting the file directory in which the software components reside. No changes to the operating environment (e.g., operating system configuration parameters) of the computing device are needed and no changes are made, which in turn can decrease the risk of negatively affecting execution or performance of other programs on the computing device.

In various embodiments, installation and starting of the data sharing system is performed in identical or virtually identical way regardless of the operating system (and file system) running on the computing device 110. For example, the set of software components for the data sharing system can include different versions of executable files for different operating systems (e.g., a version for Windows, another version for MacOS, etc.). The user clicks the appropriate executable module to start the data sharing system. The executable module in turn can initiate and start any other components, such as the database, and bring up a user interface, such as the interface illustrated in FIG. 2. Accordingly, cross-platform functionality is provided.

Figure 2:
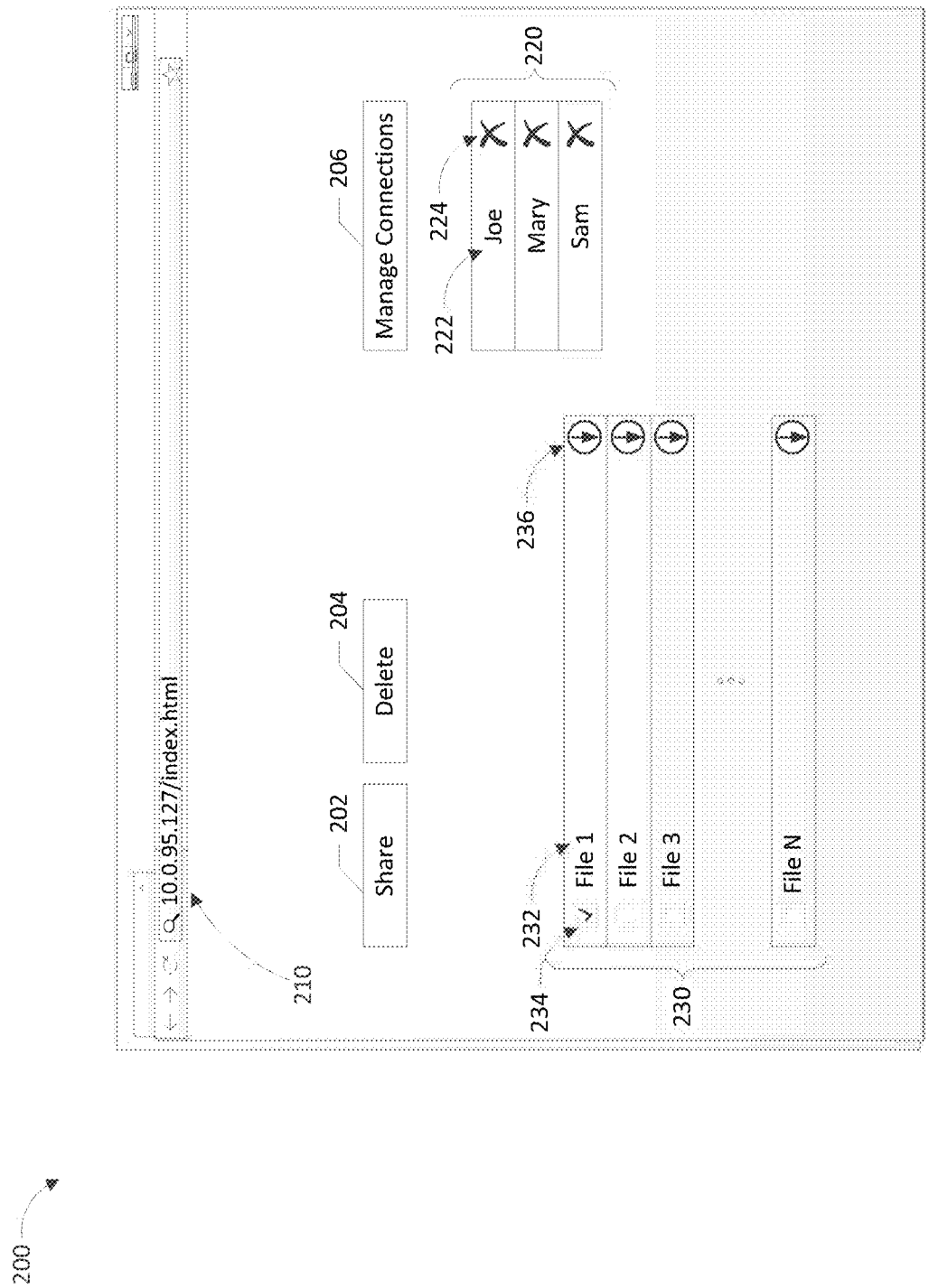
FIG. 2 illustrates an interface for ad hoc data sharing.

FIG. 2 illustrates an interface 200 for ad hoc data sharing according to some embodiments. The interface 200 can be displayed on one or more of computing devices 110 (via local address), 120, 130, 140, and 150. The interface 200 can be a web-interface and can be standardized for any operating platform or browser type so that it is displayed uniformly or substantially uniformly (e.g., similarly or in the same way) on any platform or browser. As is illustrated in FIG. 2, URL 210 can be an address of a computing device that is executing the data sharing system, such as the computing device 110. List 230 provides listing of data for sharing, such as data files, that is shared and are available for download, editing, and the like to remote users, such as users using computing devices 120, 130, 140, and 150. The list 230 includes name of file 232, check box 234 for deleting the file, and button 236 for downloading the file to remote user's computing device.

The interface 200 also includes a list 220 providing information of remote users connected to the data sharing system, such as the computing device 110. The list 220 includes name of remote user 222 and a button 220 for disallowing access to the remote user. Clicking on the button 220 has the effect of terminating or severing remote user's connection to the data sharing system and deleting the user's name from the list 220. The interface includes button 202 for sharing files, 204 for deleting files, and 206 for managing connections (e.g., remote users). Additional elements can be displayed in the interface 200. Other user interface elements can be used in addition to or instead of the illustrated elements.

In some embodiments, a remote user may not be permitted to allow access to the data sharing system to other remote users. In such embodiments, the list 220 (and button 206) may not be part of the interface 200 when the interface is displayed on the remote user's computer. In various embodiments, remote users can allow access to the data sharing system to other remote users, and the interface 200 (and button 206) are displayed.

As is illustrated, information can be shared using web interfaces without desktop or application virtualization (e.g., virtualization of the desktop of the computing device 110 on which the data sharing service is executed). Unlike desktop virtualization platforms, such as Citrix, Remote Desktop Protocol (RDP), Apple Remote Desktop, VNC, and the like, no data associated with desktop or application virtualization is transmitted to (or from) remote users. This can improve efficiency and bandwidth utilization.

Figure 3A:
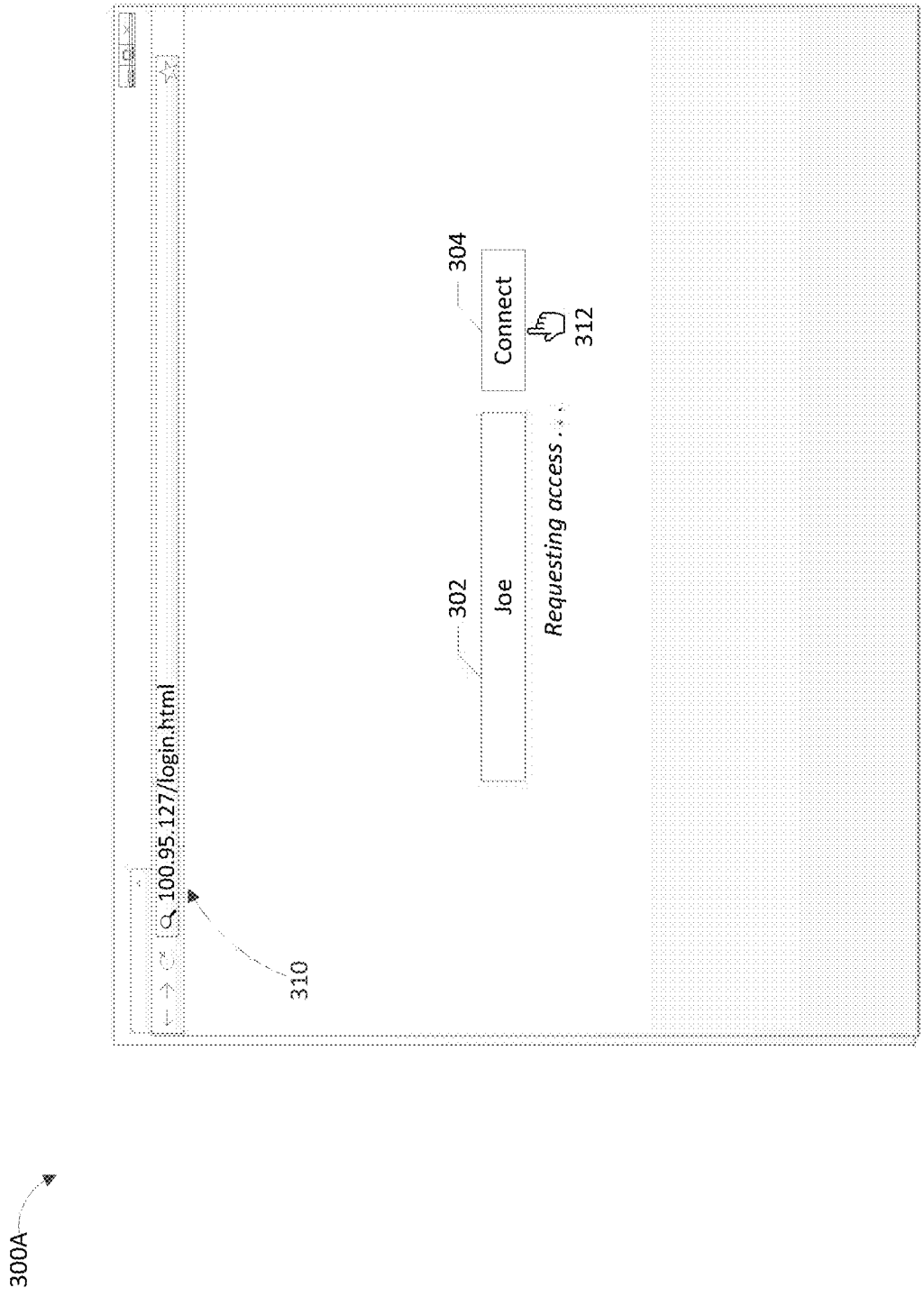
FIGS. 3A and 3B illustrate interfaces and login processes for ad hoc data sharing.
Figure 3B:
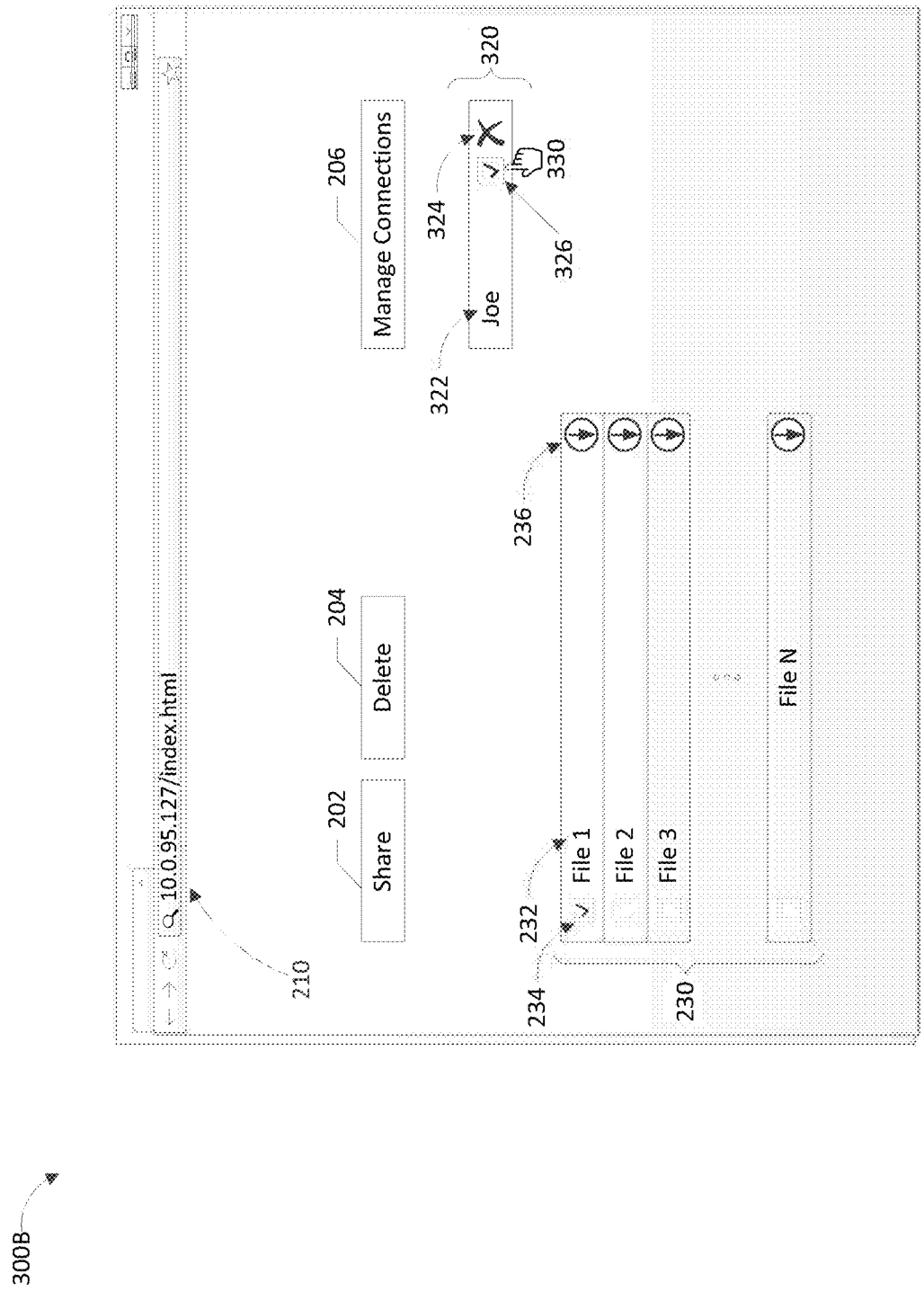

FIGS. 3A and 3B illustrate interfaces and login processes for ad hoc data sharing according to some embodiments. FIG. 3A illustrates an interface 300A for requesting connection to or joining the data sharing system that is executed by a computing device, such as the computing device 110, having an address or URL 310. A remote user enters login credentials, such as name (and, optionally, password), into field 302 and activates the connect button 304 (e.g., via mouse click illustrated as 312).

The data sharing system receives the request to join and processes the request as is illustrated in the interface 300B of FIG. 3B. Remote user's name (e.g., "Joe") is displayed in list 320 (e.g., as illustrated in box 322) and the administrator can allow the remote user access to the data sharing system by clicking the checkbox 330 (e.g., via mouse click illustrated as 330). If access is granted, remote user's name is displayed in the list, as is illustrated in the list 220 of FIG. 2. The administrator can deny access to the remote user by clicking the delete button 324.

In some embodiments, manage connection button 206 is configured to automatically provide access to remote users requesting to join. For example, clicking the button 206 to provide automatic access may obviate the need to click the checkbox 330. Instead, remote users are automatically allowed to connect to the data sharing system. Additional elements can be displayed in the interfaces 300A and 300B. Other user interface elements can be used in addition to or instead of the illustrated elements.

Figure 4:
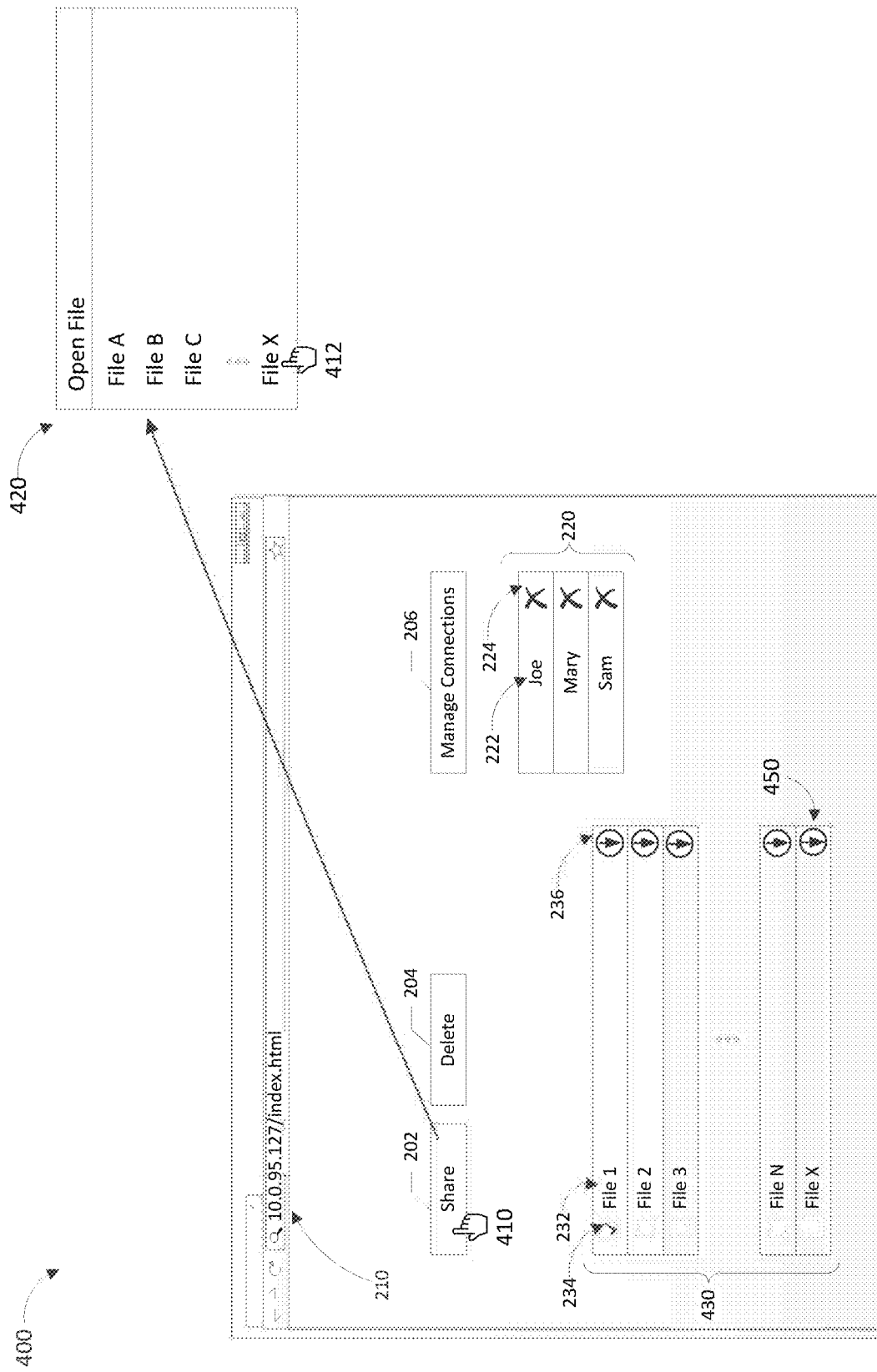
FIG. 4 illustrates an interface for sharing files.

FIG. 4 illustrates an interface 400 for sharing files according to some embodiments. As described above, the interface 400 can be displayed on the server executing the data sharing system or any of the remote computers. To share a file, the user can click the share button 202 (e.g., via mouse click illustrated as 410), which in turn can display open file dialog 420. The user can select a file, such as "File X," for sharing (e.g., via mouse click illustrated as 412). This results in the selected file being displayed in listing 430 as item 450. New file displayed as item 450 is displayed in the interfaces 400 of all users that have joined the data sharing system (including the user running the data sharing service and all remote users connected to the service). Any user that has joined the data sharing system can upload files, which can be stored locally in the computing device that executes the data sharing service, such as device 110, and any remote user that joins the data sharing system can see the shared data files and download any of them. In some embodiments, the ability to upload or download files can be restricted to users having necessary privileges. Additional elements can be displayed in the interface 400. Other user interface elements can be used in addition to or instead of the illustrated elements.

Figure 5A:
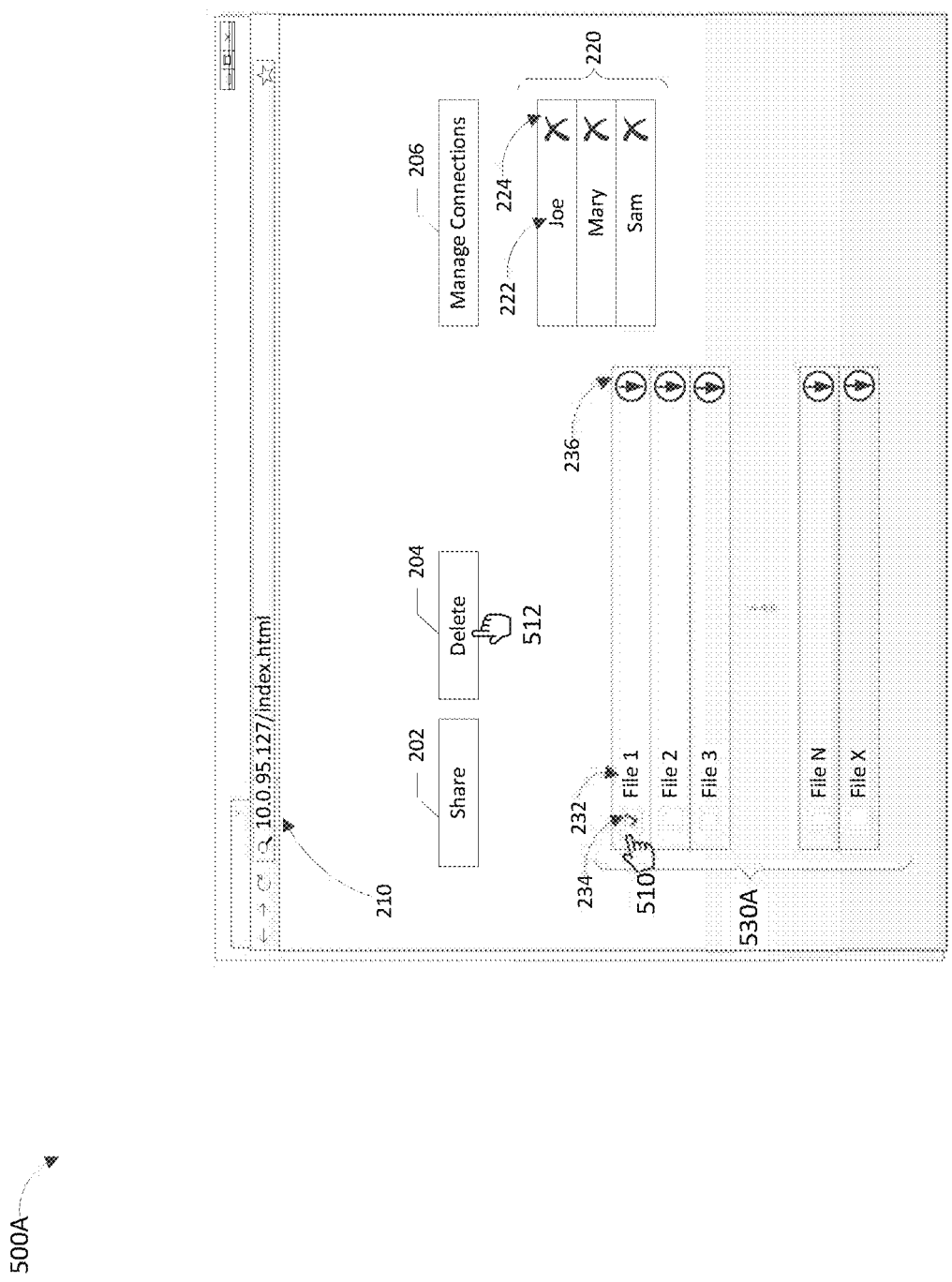
FIGS. 5A and 5B illustrates interfaces and file removal processes.
Figure 5B:
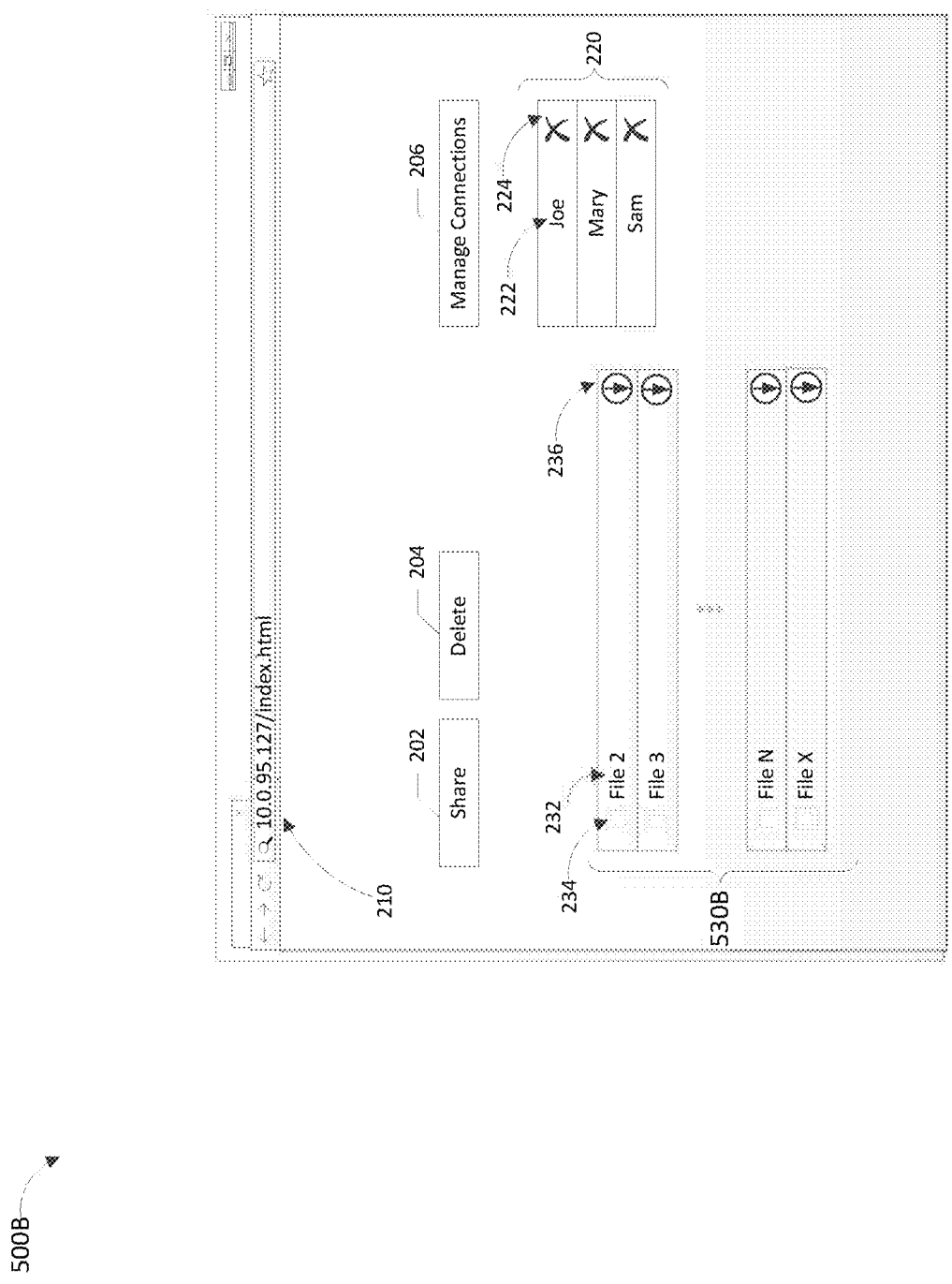

FIGS. 5A and 5B illustrates interfaces 500A and 500B and file removal processes according to some embodiments. As is illustrated in FIG. 5A, a user can select "File 1" (labeled as 232) from the list 530A for deletion by checking the box 234 (e.g., via mouse click illustrated as 510) and clicking the delete button 204 (e.g., via mouse click illustrated as 512). As a result, "File 1" is removed from the data sharing system (which may result in removal of the file from the storage of the computing device running the data sharing service). As is illustrated in FIG. 5B, the list 530B does not include "File 1," which is displayed in the interfaces of all users that have joined the data sharing system. In some embodiments, any user that has joined the data sharing system can delete any of the files. In other embodiments, deletion of the files (or specific files) can be restricted to users having necessary privileges or is reserved only for the administrator running the data sharing service. Additional elements can be displayed in the interfaces 500A and 500B. Other user interface elements can be used in addition to or instead of the illustrated elements.

Figure 6:
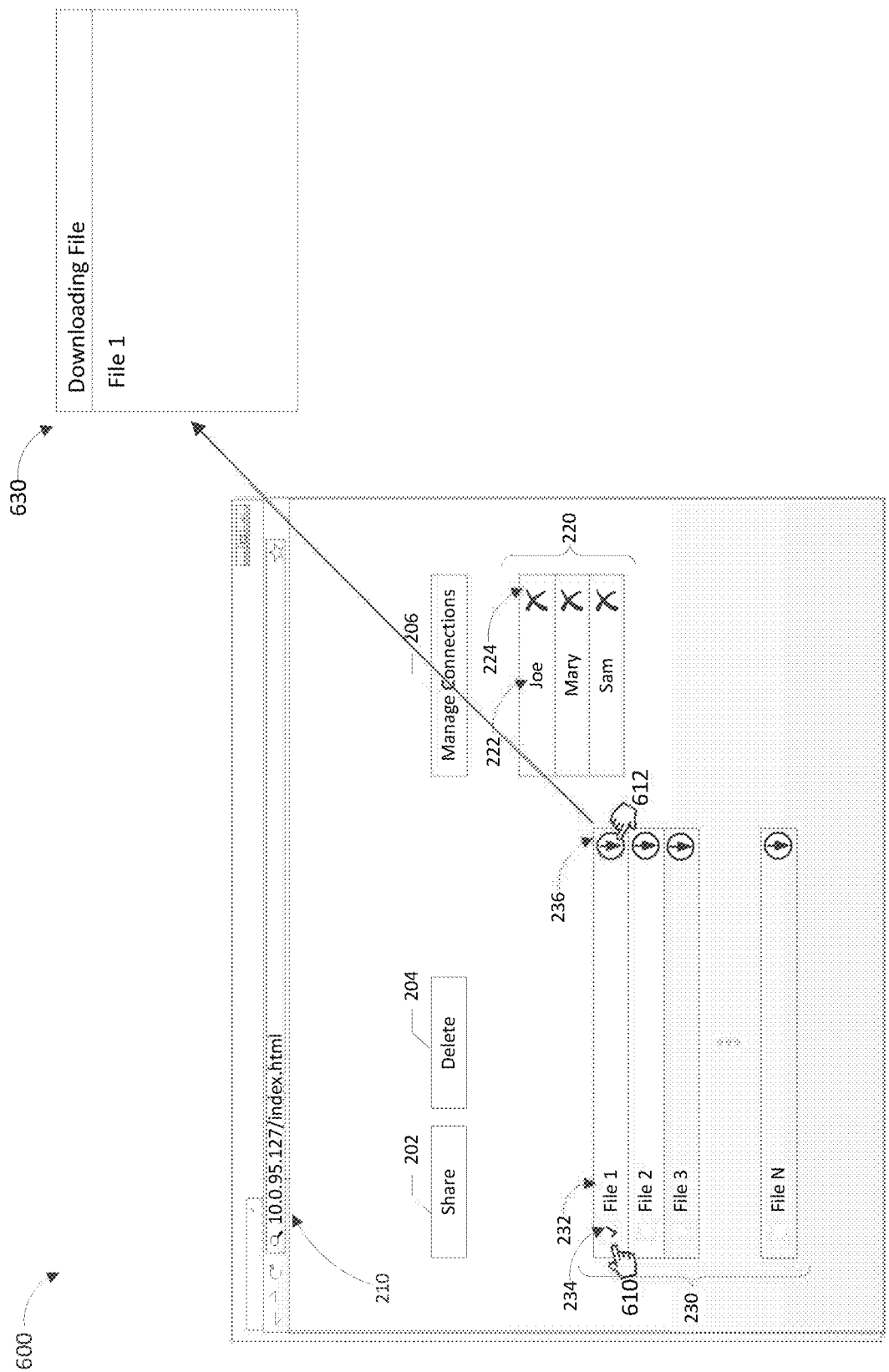
FIG. 6 illustrates an interface and file download process.

FIG. 6 illustrates an interface 600 and file download process according to some embodiments. A user that has joined the data sharing system can download "File 1" (labeled as 232) from the list 230 by optionally checking the box 610 (e.g., via mouse click illustrated as 610) and clicking the download button 236 (e.g., (e.g., via mouse click illustrated as 612). This action brings up file download dialog 630. Requested file is transmitted from the computing device running the data sharing service to the remote computing device that requested the download. In some embodiments, any user that has joined the data sharing system can download any of the files. In other embodiments, downloading of the files (or specific files) can be restricted to users having necessary privileges. Additional elements can be displayed in the interface 600. Other user interface elements can be used in addition to or instead of the illustrated elements.

Figure 7:
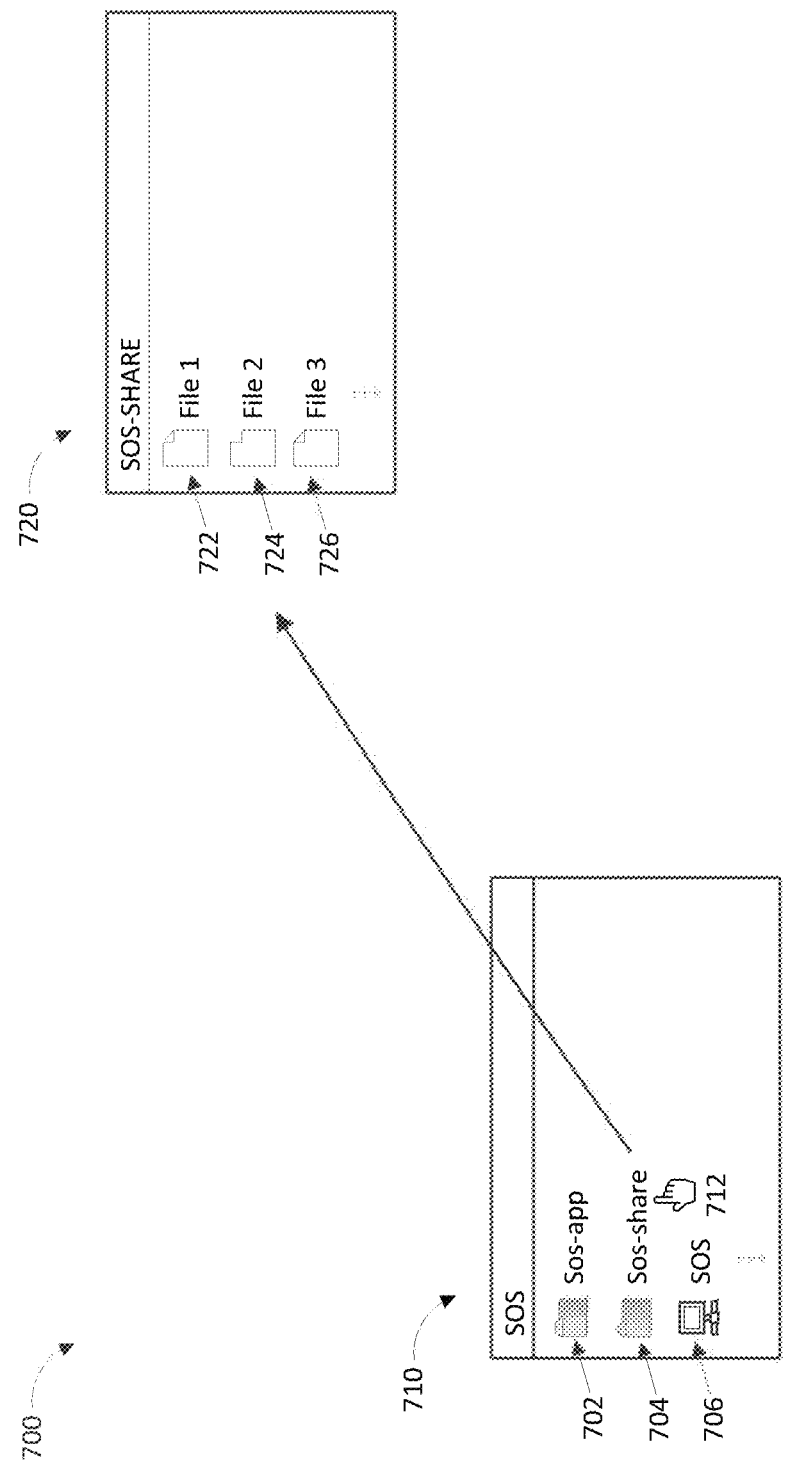
FIG. 7 illustrates an organization of components of an ad hoc data sharing system.

FIG. 7 illustrates an organization of components 700 of an ad hoc data sharing system according to some embodiments. Folder or directory 710 illustrates structure of the data sharing system, which includes folder 702 ("Sos-app") for storing application files, folder 704 ("Sos-share") for storing shared data, and executable 706 ("SOS") for running the data sharing system. As explained above, there may be multiple executable files for different operating systems. Contents of folder 704 that stores shared data is illustrated in folder 720. Shared files 722 ("File 1"), 724 ("File 2"), 736 ("File 3"), etc. are stored in the folder 720. These files are shared as is illustrated in the list 230. In some embodiments, shared data can be moved seamlessly across different computers and platforms. For example, a user can copy the contents of folder 720 ("Sos-share") from a computing device running MacOS to "Sos-share" folder on another computing device running Windows and be able to access copied data and provide access to remote users via executing a data sharing system on the Windows device. This is accomplished despite the fact that the two computing devices run different operating systems that utilize different file systems.

Figure 8A:
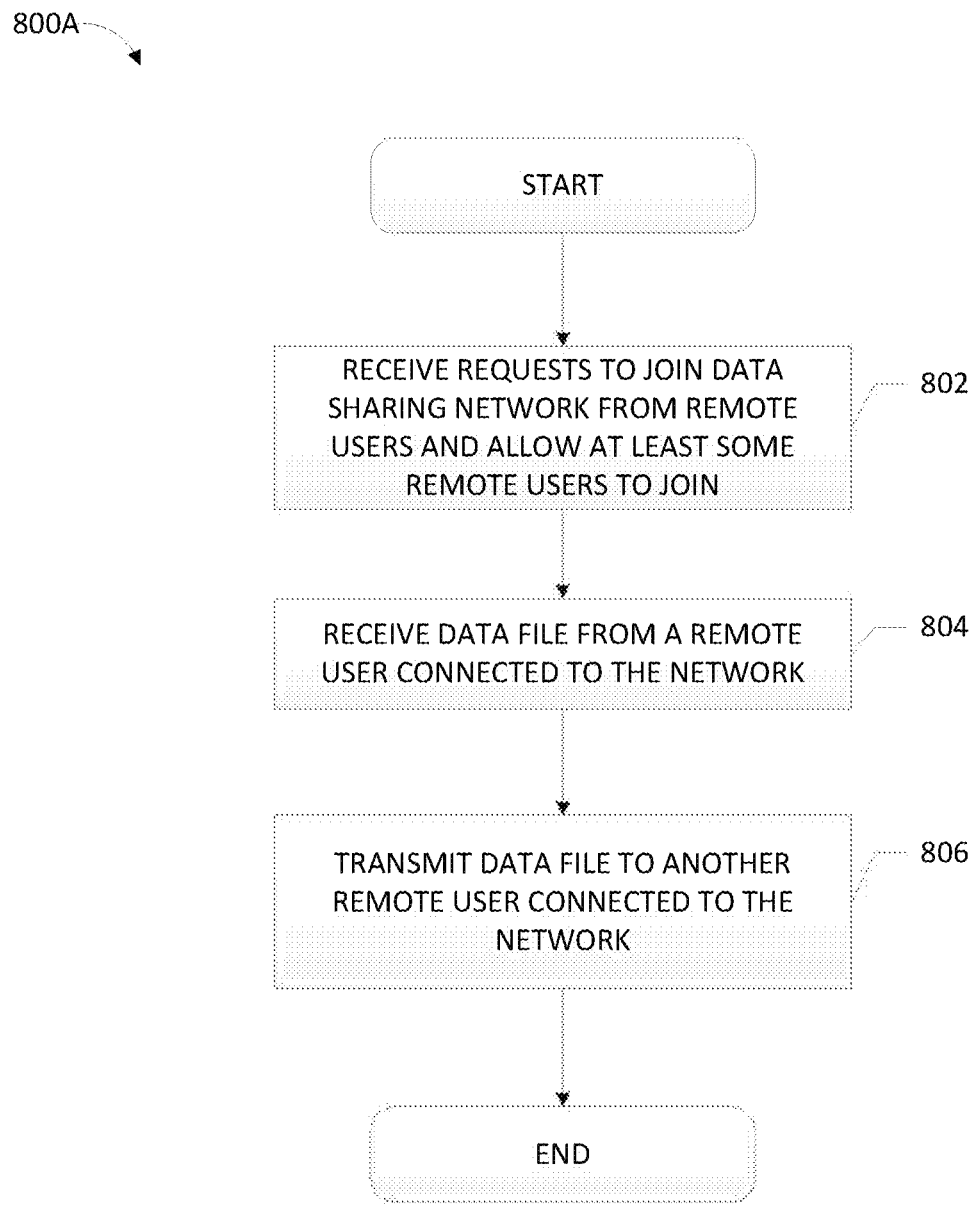
FIGS. 8A and 8B illustrate processes for sharing data.

FIG. 8A illustrates a process 800A for data sharing according to some embodiments. Process 800A can be executed by one or more of computing devices 110, 120, 130, 140, and 150. Process 800A starts in block 802 where it receives requests to join a data network (or group) from remote users using remote computing devices. For example, the requests can be received from web interfaces running on the remote computing devices. Process 800A can process the requests and allow at least some of the remote users to join the data sharing network. In block 804, process 800A can receive data for sharing with the other users from a remote user connected to the data sharing network. For example, a data file can be uploaded via the interface 400. The received data can be stored in the computing device executing the data sharing process. In block 806, the received data can be transmitted to another remote user who joined the data sharing network. For example, the data file can be transmitted in response to request for download sent via interface 600.

Figure 8B:
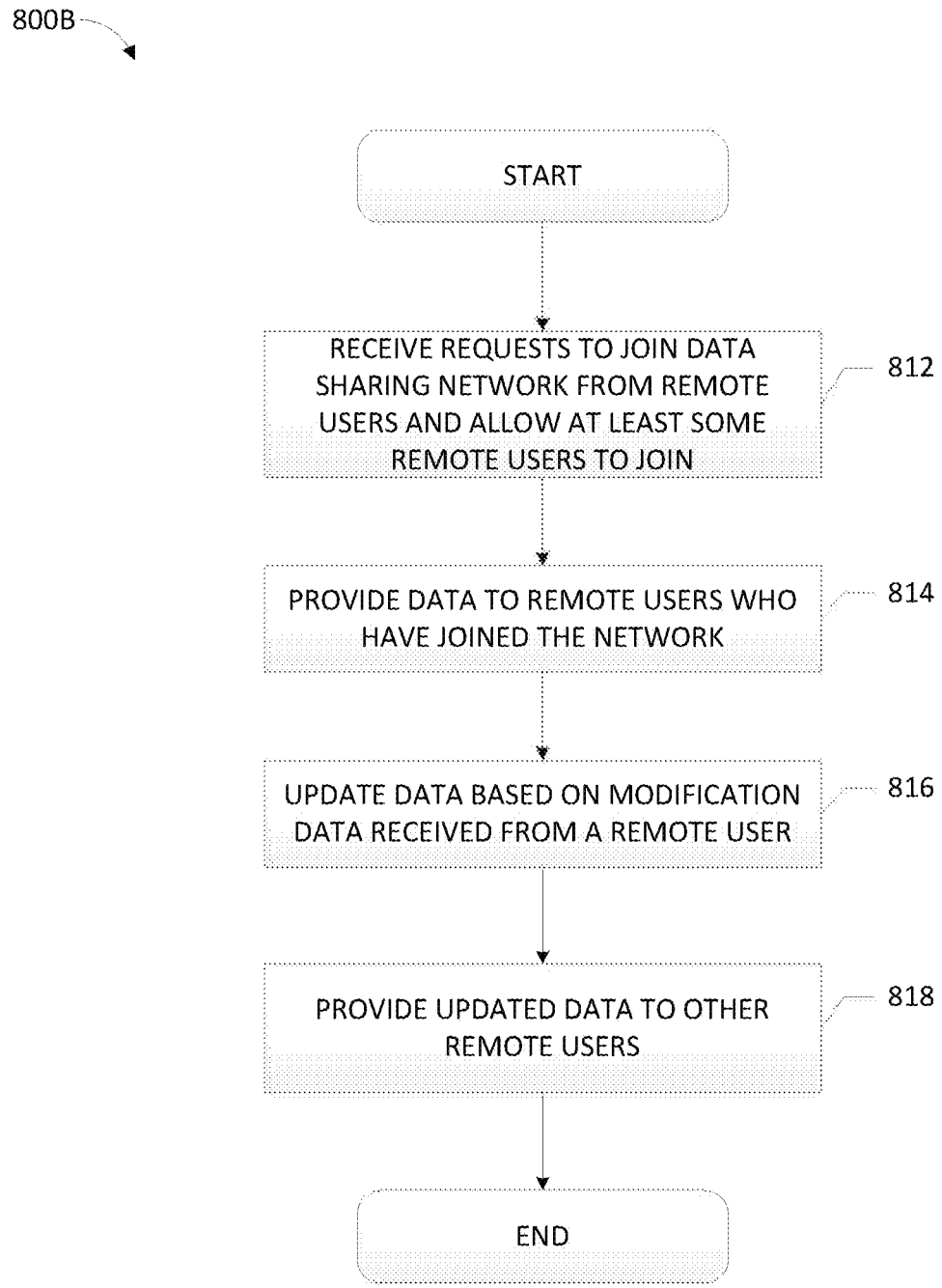

FIG. 8B illustrates a process 800B for data sharing according to some embodiments. Process 800B can be executed by one or more of computing devices 110, 120, 130, 140, and 150. Process 800B starts in block 812 where it receives requests to join a data sharing network (or group) from remote users using remote computing devices. For example, the requests can be received from web interfaces running on the remote computing devices. Process 800B can process the requests and allow the remote computing devices to join the data sharing system. In block 814, process 800B can provide shared data to computing devices that have joined the data sharing network. For example, medical data may be provided. In block 816, process 800B can update shared data based on modification data received from a remote user who has joined the data sharing network. For example, part of shared data can be updated. As another example, the entirety of shared data can be updated. In block 818, process 800B can share the updated data with remote users that have joined the data sharing system, thereby propagating the changes to other users. In some embodiments, updated data is provided to remote users substantially in real-time with receiving the modification data.

In some embodiments, the data sharing system includes search functionality (as illustrated below) that allows users that have joined the system to search for data of interest. The data sharing service can process requests for searching for data of interest, which may include keywords, strings of text, metadata, and the like. The data sharing service can locate one or more files that include or correspond to the data of interest and transmit the located one or more files to the requestor. In certain embodiments, real-time or nearly real-time communication, such as instant messaging, VOIP, live web conferencing, and the like can be available to users of a data sharing system.

Ad Hoc Sharing of Medical Data

In various embodiments, data sharing system can be utilized for maintaining, sharing, and modifying medical data. Medical data can include patient identification information, patient records, diagnosis, treatment plan, treatment procedures or protocols for treating various medical conditions, and the like. Such data can be seamlessly kept up-to-date and shared among various medical professionals, such as doctors, nurses, pharmacists, etc.

FIG. 9 illustrates an interface 900 for sharing medical data according to some embodiments. The interface 900 can be displayed as part of executing data sharing systems of various embodiments. In some embodiments, a data sharing system can be customized or configured for storing, sharing, and editing medical data, which complies with applicable guidelines and regulations for medical data, such as HIPPA, NIST, etc. For example, interface 900 can be used for sharing medical data in a treatment facility, such as a hospital.

The interface 900 can be displayed on one or more of computing devices 110 (via local address), 120, 130, 140, and 150. For remote users, the interface 900 can be displayed after the user has successfully logged in by providing appropriate credentials. The interface 900 can be a web-interface and can be standardized for any operating platform or browser type so that it is displayed uniformly or substantially uniformly (e.g., similarly or in the same way) on any platform or browser. As is illustrated in FIG. 9, URL 902 can be an address of a computing device that is executing the data sharing system, such as the computing device 110. Buttons 912 is configured to display a list of patients 950, button 914 is configured to enter new patient information, button 916 is configured for consulting team members, and button 918 is configured for searching medical data. Search box 922 and button 924 are configured for searching reference material, such as treatment procedures or protocols (e.g., articles), and button 930 is configured for adjusting or modifying settings of the data sharing system are displayed.

Dropdown 940 allows a user to select a particular treatment department or team. For example, selecting General Surgery can result in the list 950 displaying information for patients treated by the General Surgery team. Other teams can be selected, such as Internal Medicine, Pediatrics, Orthopedic Surgery, Plastic Surgery, and the like. List 950 provides a table with patient data, including patient name (e.g., "John Doe"), identification (e.g., "012345"), age and gender (e.g., "61 M"), name of treating physician (e.g., "Smith, Joe"), patient's room number in the treatment facility, such as a hospital, (e.g., "424"), diagnosis (e.g., "small bowel obstruction"), procedure performed (e.g., "4/6 right hemicolectomy with small bowel resection"), medications taken by the patient, laboratory or imaging work, precautions (e.g., "NPO; full code"), treatment plan (e.g., "clears?"). List 950 can include information for all patients that are assigned to or being treated by the team selected in the dropdown 940. List 950 can be accessed at any time by selecting or clicking the button 912 (e.g., via mouse click illustrated as 962).

Footer 960 includes additional data, such as phone numbers for the physician on call (e.g., "Smith"), phone numbers for the OR desk, scheduling, pre-operatory, lab, blood bank, pharmacy, etc. Footer 960 includes scheduling information, such as reminder that at noon on Tuesday there is a round table meeting. Footer 960 includes code for dialing numbers outside the treatment facility, codes for waiting rooms and computer room, link to schedule of the operating room, and link to on-call schedule. Additional or alternative information, such as phone numbers, codes, images, videos, links, and the like, that can serve as useful reference for the treatment team can be displayed in the footer 960.

Additional elements can be displayed in the interface 900. Other user interface elements can be used in addition to or instead of the illustrated elements. For example, buttons for adjusting the font size, sorting, and printing reports can be displayed in the interface 900.

Figure 10:
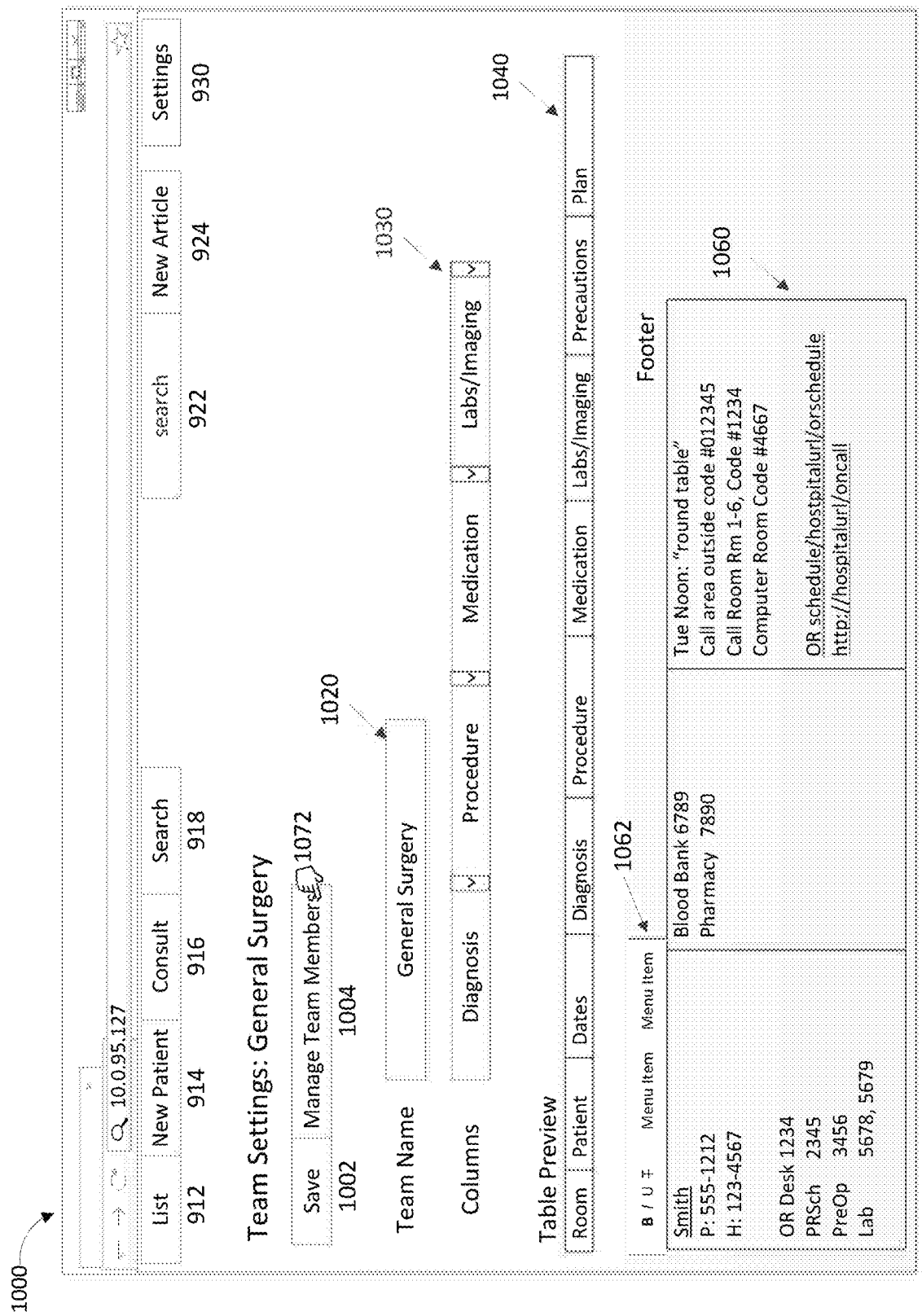
FIG. 10 illustrates an interface for editing medical data.

FIG. 10 illustrates an interface 1000 for editing medical data according to some embodiments. The interface 1000 can be displayed as a result of clicking in the footer 950

(e.g., via mouse click illustrated as 964). Because General Surgery team was selected in the dropdown 940 in FIG. 9, data associated with this team can be edited using the interface 1000. Button 1004 can be used for managing team members. Box 1020 can be used for editing the team name. Control 1030 can be used for customizing the view of the list 950, such as for removing, adding, rearranging the order, etc. of the columns in the table. Preview 1040 displays how the list 950 will be shown when adjustments are applied. Footer 1060 can be edited by adding, deleting, formatting, etc. information in the footer. Menu 1062 can be used for formatting footer content (e.g., bold, italicize, underline, strikethrough, etc.), paragraph formatting, and the like. In some embodiments, editing the footer 1060 is similar to editing a document in a word processor, with the ability to freely format the text. Button 1002 can be used for saving desired changes. In some embodiments, changes are applied only to the view for the General Surgery team. In other embodiments, changes are applied to views for all other teams. Additional elements can be displayed in the interface 1000. Other user interface elements can be used in addition to or instead of the illustrated elements.

Figure 11:
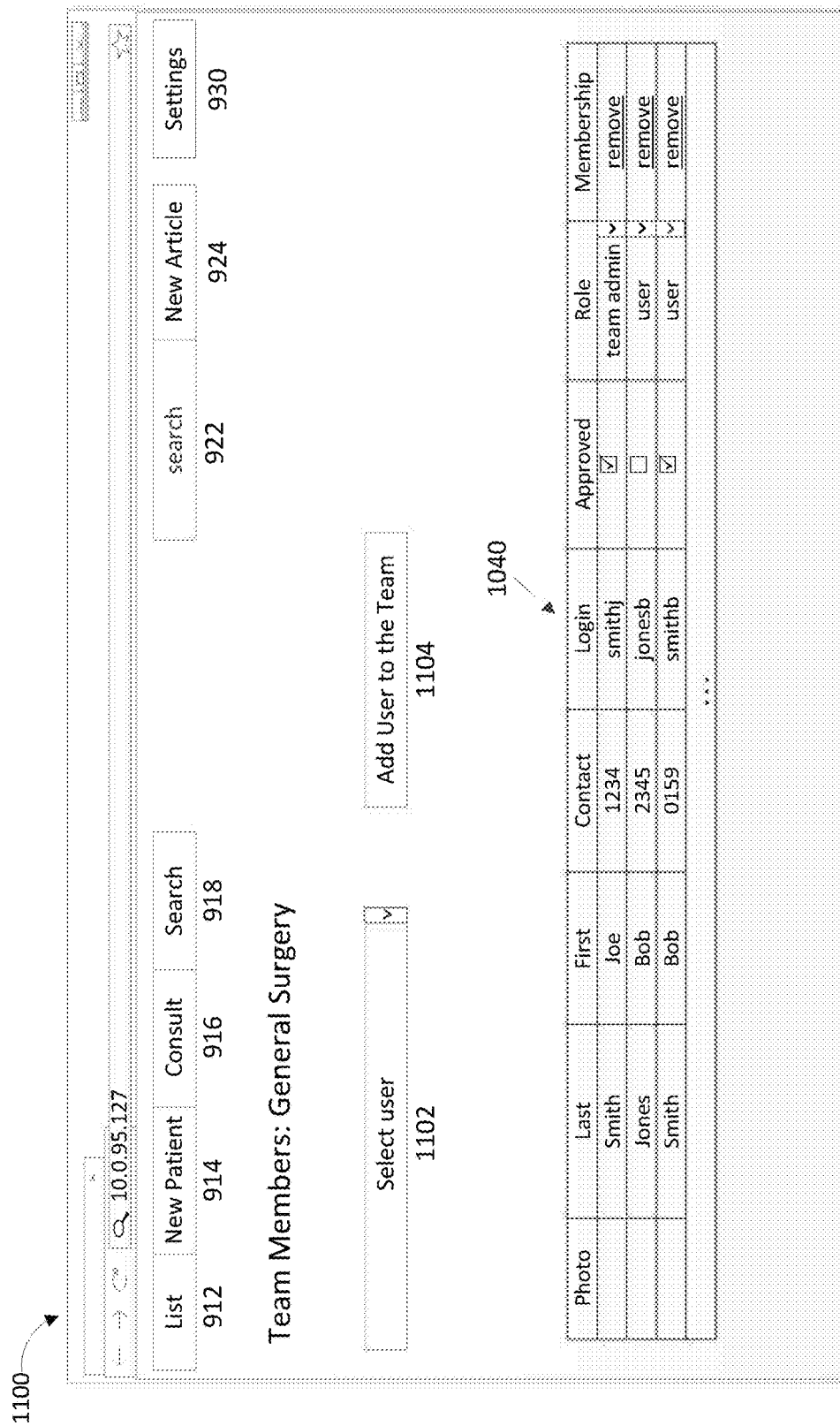
FIG. 11 illustrates an interface for editing team members.

FIG. 11 illustrates an interface 1100 for editing team members according to some embodiments. The interface 1100 can be displayed as a result of selecting the button 1004 (e.g., via mouse click illustrated as 1072). As is illustrated, team members of the General Surgery team can be modified using dropdown 1102 for selecting particular user and button 1104 for adding the selected user to the team. List 1040 (e.g., table) lists users that are assigned to the General Surgery team and information associated with the users (e.g., first and last name, contact number, and login credentials). Also displayed are checkboxes for approving the user for team membership and dropdowns for assigning a particular role to the user (e.g., regular user, team administrator with privileges to modify team members, etc.). Links for removing the user as team member are also displayed. Additional elements can be displayed in the interface 1100. Other user interface elements can be used in addition to or instead of the illustrated elements.

FIG. 12 illustrates an interface 1200 for editing patient information according to some embodiments. Interface 1200 can be displayed as a result of clicking on patient name in the list 950 (e.g., via mouse click illustrated as 966). List 1210 is displayed for editing patient information or record. Button 1222 is for saving changes, button 1224 is for copying patient record to another for user by another treatment team, and button 1226 is for deleting patient record. Box 1230 is for adding notes. List 1240 provides links to patient treatment protocols (or articles) that may be relevant for treating the particular patient. List of articles can be automatically displayed by the data sharing system as a result of searching the articles repository or database using one or more keywords that reflect patient's diagnosis or condition. In some embodiments, the keywords can be entered by the user (e.g., into a field in the list 1210) or can be generated by the system using, for example, information associated with patient's diagnosis, procedure, history, summary, and the like. Additional elements can be displayed in the interface 1200. Other user interface elements can be used in addition to or instead of the illustrated elements.

Figure 13:
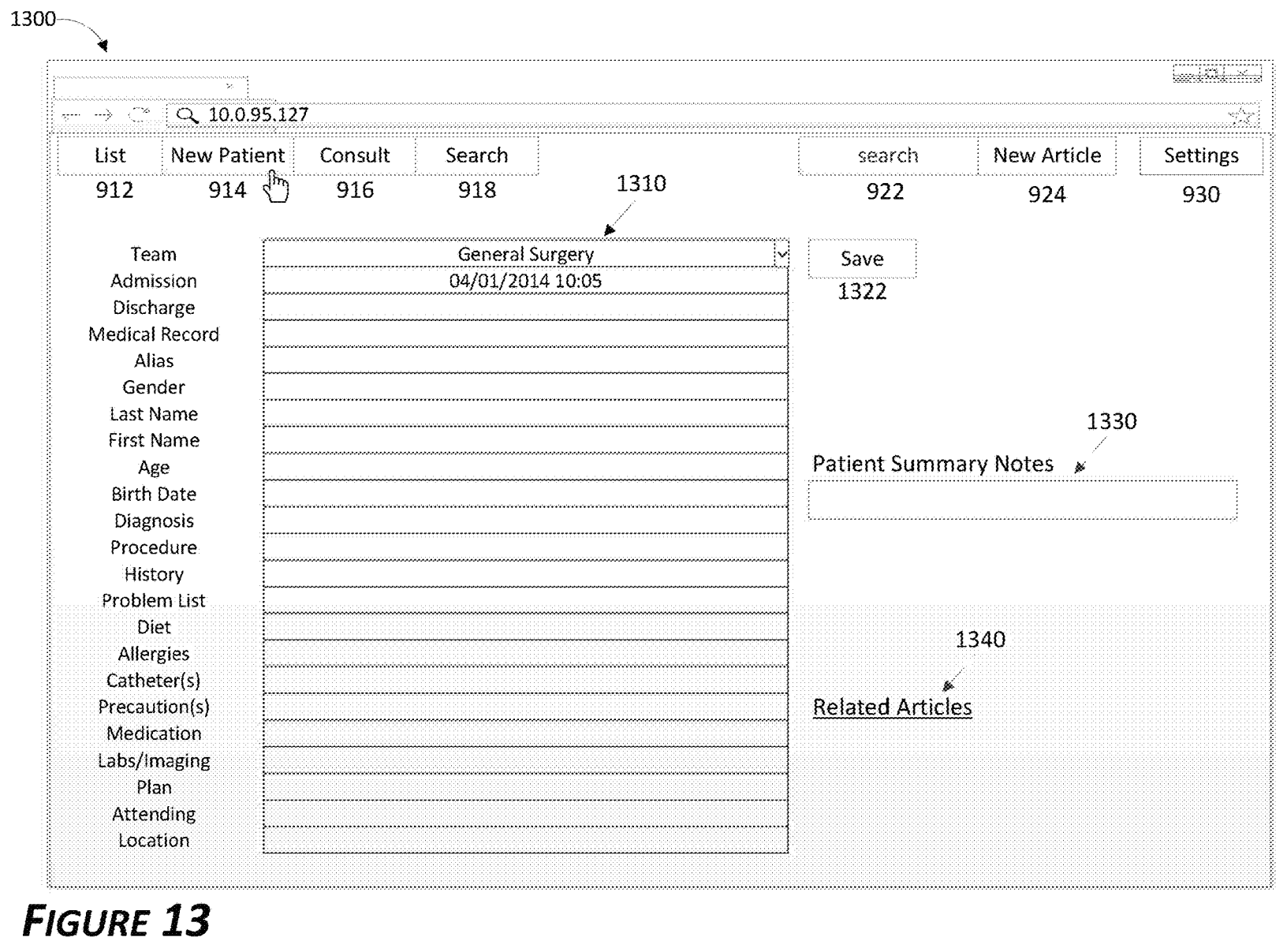

FIG. 13 illustrates an interface 1300 for adding new patient information according to some embodiments. The interface 1300 can be displayed as a result of selecting or clicking button the 914. Patient information can be entered into the list 1310, and patient summary notes can be entered into box 1330. Treatment team can be assigned via dropdown displayed in list 1310. Data can be saved via button 1322. As explained above, list 1340 can display links to articles related to the treatment of the patient. Additional elements can be displayed in the interface 1300. Other user interface elements can be used in addition to or instead of the illustrated elements.

In some embodiments, the data storage system can suggest entries as the user is entering or modifying data, such as medical data. For example, in the interface 1300 for entering new patient data, the data storage system may suggest certain words or entries as the user is entering new patient information. The system can be configured to not insist on the suggested entries and to allow the user to easily override any of the suggestions. In certain embodiments, information can be saved even when not all fields have been completed. For example, in the interface 1300 for entering new patient data, the user can provide data for only one or several fields displayed in the list 1310 and still be able to save the data.

Figure 14:
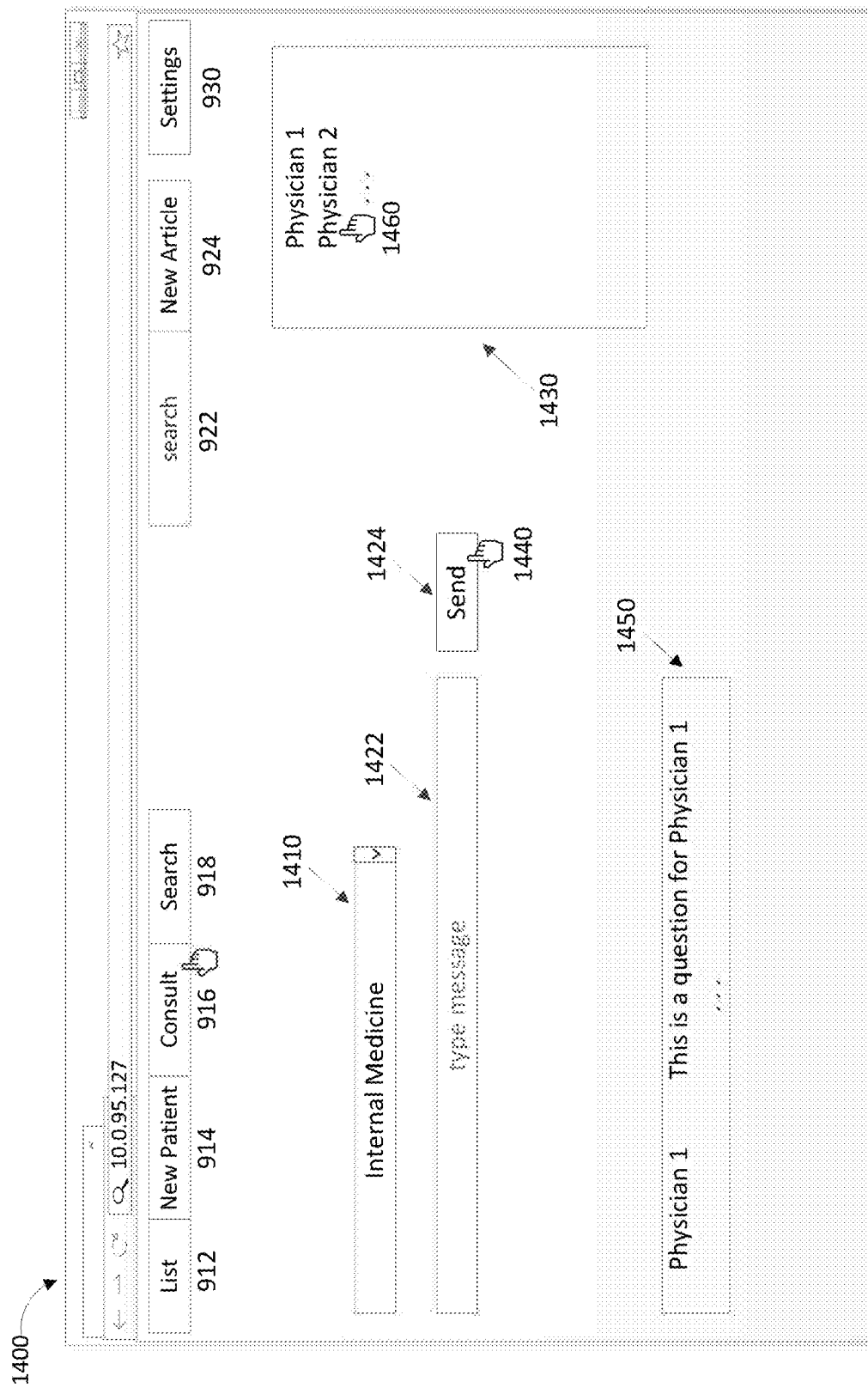
FIG. 14 illustrates an interface for consulting team members.

FIG. 14 illustrates an interface 1400 for consulting team members according to some embodiments. The interface 1400 can be displayed as a result of selecting or clicking button 916. Questions can be posted to members of same or different team using the following process. Dropdown 1410 can be used for selecting a particular team, which in turn brings up team member names in the list 1430. For example, Physician 1 from Internal Medicine team can be selected (e.g., via mouse click illustrated as 1460). Message can be entered into box 1422 and posted for the Physician 1 by clicking send button 1424 (e.g., via mouse click illustrated as 1440). Message can include any information, such as a question, note, article (or link to an article), etc. List of posted messages is displayed in 1450. Additional elements can be displayed in the interface 1400. Other user interface elements can be used in addition to or instead of the illustrated elements.

In some embodiments, any team member can be assigned to be on-call. This can be performed in a variety of ways. For example, in the list 1430 of the interface 1400, selecting or clicking the name of a physician (e.g., via mouse click illustrated as 1460) can designate the physician to be on call. In certain embodiments, this action can be performed (or undone) only by a user having team administrator privileges.

Figure 15:
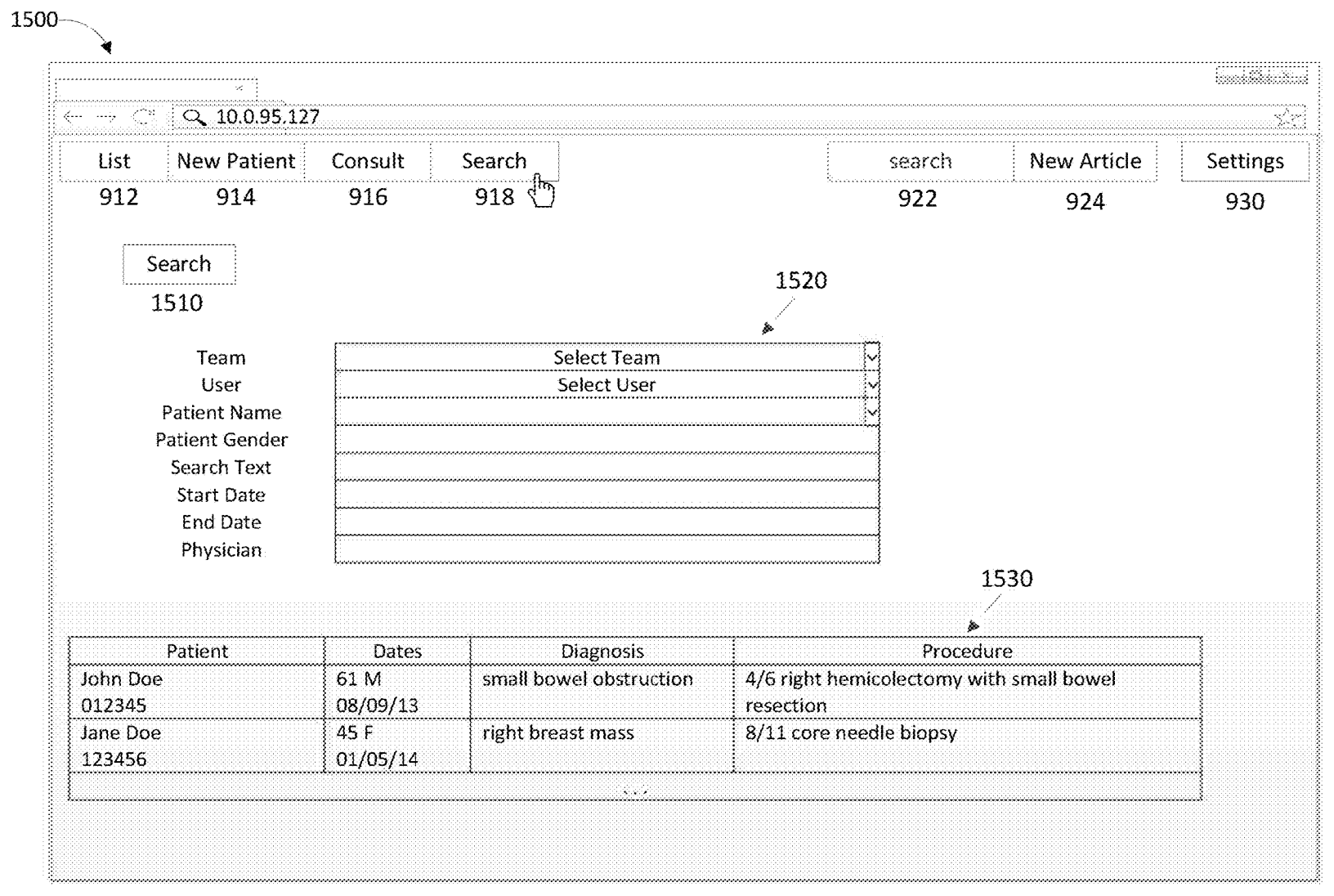

FIG. 15 illustrates an interface 1500 for searching medical data according to some embodiments. The interface 1500 can be displayed as a result of selecting or clicking the button 918. List 1520 is configured for performing the search. Search parameters are selected (e.g., via dropdowns) and entered into the fields of the list 1520. Search button 1510 performs the search. In some embodiments, the data storage system searches the associated database for matching data. Matching data is listed in the list 1530. Additional elements can be displayed in the interface 1500. Other user interface elements can be used in addition to or instead of the illustrated elements.

Figure 16:
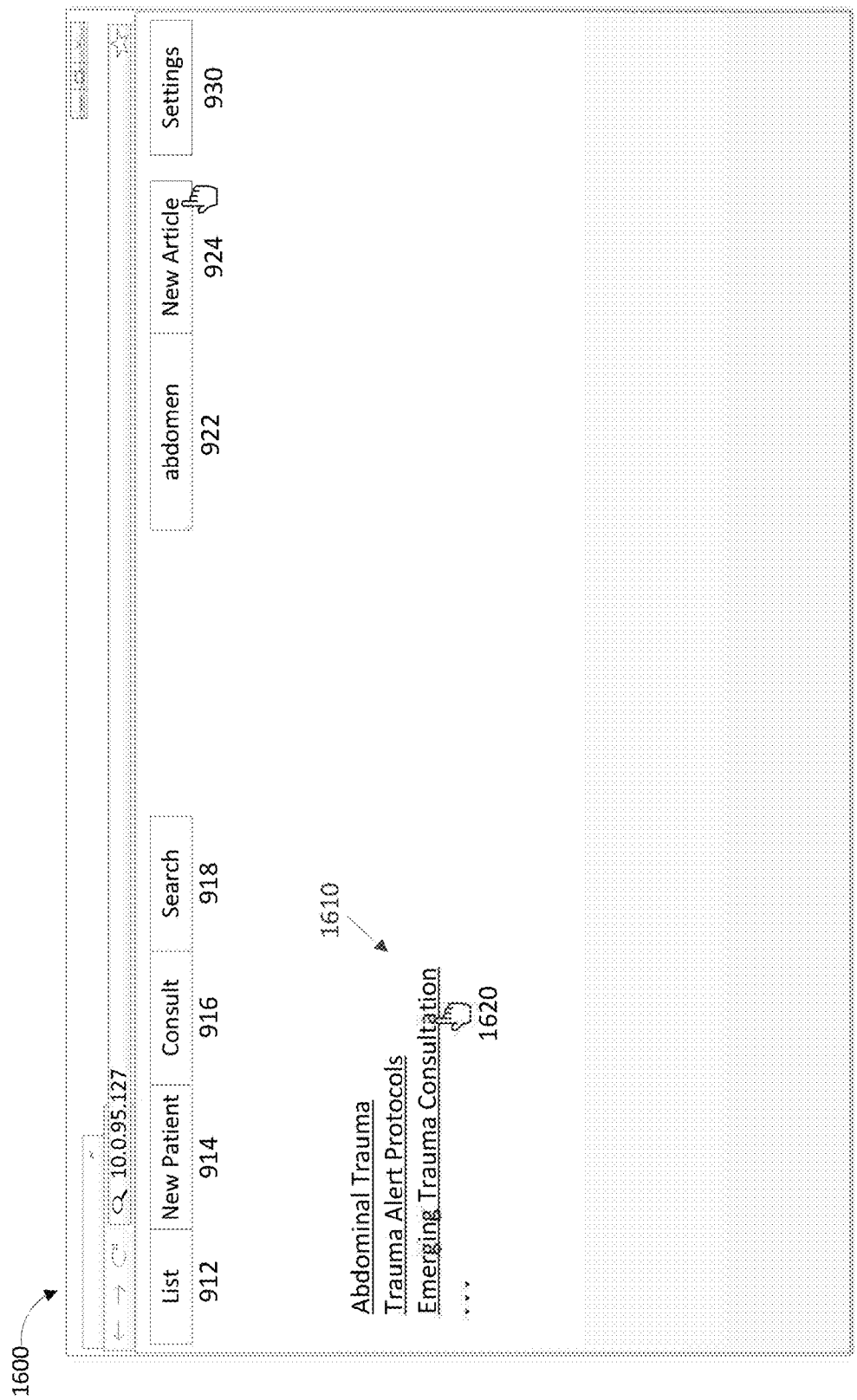
FIG. 16 illustrates an interface for searching treatment protocols.

FIG. 16 illustrates an interface 1600 for searching treatment protocols or articles according to some embodiments. The interface 1600 can be displayed as a result of typing search parameters into box 922 and selecting or clicking the button 924. For instance, a user can search for relevant articles by entering the word "abdomen." In some embodiments, the data storage system searches the associated database for matching articles. For example, the search can be performed on keywords associated with the articles. As another example, the search can be performed in the text of the articles. Matching articles are displayed in the list 1610. Article of interest can be selected by clicking the desired link. Additional elements can be displayed in the interface 1600. Other user interface elements can be used in addition to or instead of the illustrated elements.

Figure 17:
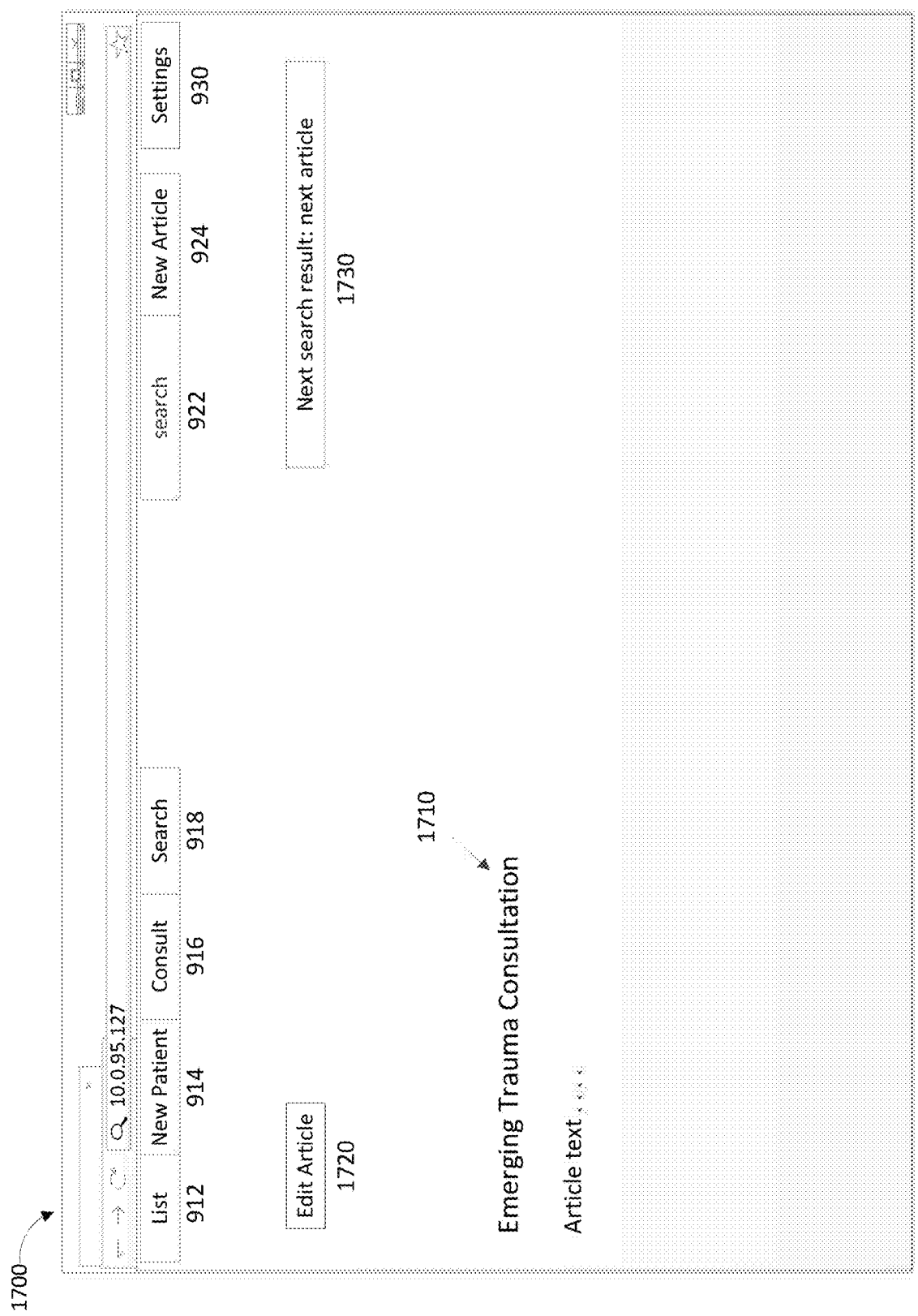
FIG. 17 illustrates an interface for displaying a treatment protocol.

FIG. 17 illustrates an interface 1700 for displaying a treatment protocol or article according to some embodiments. The interface 1600 can be displayed as a result of selecting an article of interest (e.g., via mouse click illustrated as 1620). Article is displayed in the container 1710. The article can include information related to particular treatment plan or procedure for a condition or diagnosis adopted by the treatment facility. Articles can include text, images, videos, and the like. A user can edit the article by clicking the button 1720. Next or previous article (in the list 1610) can be displayed in box 1730, and can be accessed by following the link. Additional elements can be displayed in the interface 1700. Other user interface elements can be used in addition to or instead of the illustrated elements.

Figure 18:
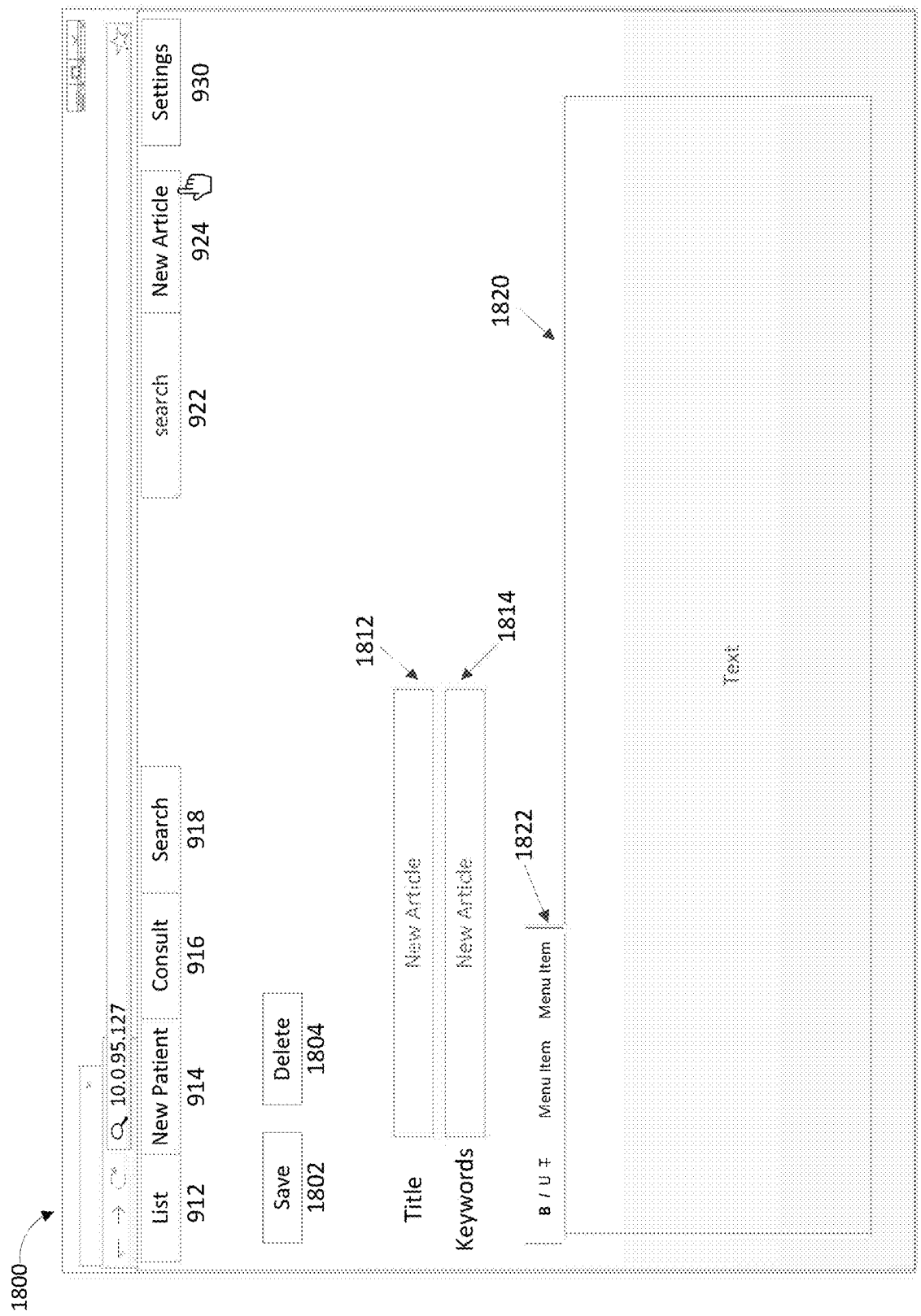
FIG. 18 illustrates an interface for adding a new treatment protocol.

FIG. 18 illustrates an interface 1800 for adding a new treatment protocol or article according to some embodiments. Title and keywords can be entered using boxes 1812 and 814. Article content, which can include text, images, videos, links, etc., can be entered via control 1820. Menu 1822 can be used for formatting the content (e.g., bold, italicize, underline, strikethrough, etc.), paragraph formatting, and the like. In some embodiments, entering or editing article content is similar to editing a document in a word processor, with the ability to freely format the text. Button 1002 can be used for saving desired changes. Button 1804 can be used for deleting the article. Additional elements can be displayed in the interface 1800. Other user interface elements can be used in addition to or instead of the illustrated elements.

In some embodiments, data (e.g., patient data, articles, etc.) can be modified by any user that has joined the data sharing system. Updated data is immediately displayed to all other users who have joined the data sharing system (or who will join the data sharing system at a later time). Accordingly, storing, maintaining, and updating medical data can be performed securely and seamlessly.

In various embodiments, reference material or articles are available and may be linked to specified fields within a patient record. For example, when entering patient information within specified patient data fields, keywords may automatically pop up with the ability to hyperlink to an article library. While reviewing the patient data, keywords may further be entered into appropriated search fields resulting in automatic pop up of relevant reference material. This can facilitate accurate and speedy patient treatment. The ability to create a reference library by users who understand the most relevant information for care of their patients can facilitate advanced level of knowledge and care for patients. The linking of information between patient data and the reference library can facilitate fast and accurate patient care during critical moments when second guessing likely occurs due to the lack of time for more thorough research. Treatment of patients is improved and high level of accuracy and security is provided.

In some embodiments, reference material may include any type of electronic media (including written literature, hyperlinks, videos, images, etc.) pertaining to patient treatment. New reference material introduced through a particular authorized network user can be saved and, optionally, encrypted in the database. Reference material can be categorized separately from patient data and be capable of being linked by keyword, subject matter, or other suitable manner of association with the patient data. The effect of this linkage can allow a user to quickly research a particular patient condition or diagnosis according to selected information for the given condition. Because users can concurrently introduce, save, and share information, users may organically build and edit a reference library unique to their interests and be able to access said information at any time and from any location. Further, libraries comprising unique information may be built around the specialized needs of any given patient or users. These may be personalized private libraries that may also be merged with other shared libraries.

In certain embodiments, the content of material in collection or library can automatically be keyword-linked between various topical fields such that the material may be searched by choice of word, subject matter, source, or title as it relates with a patient's medical record. Rather than printing and placing copies of research material in a patient's file or saving it on a local computer or local computer network in loosely organized files, cultivation and organization of relevant secondary data relating to the specialized care of patients can be attained. This can also serve as a valuable tool for students in residence. In fact, information sharing within a secured private network and automatic linking and access to reference material can serve as an invaluable tool for nearly any setting in which ongoing training and education is needed.

Figure 19A:
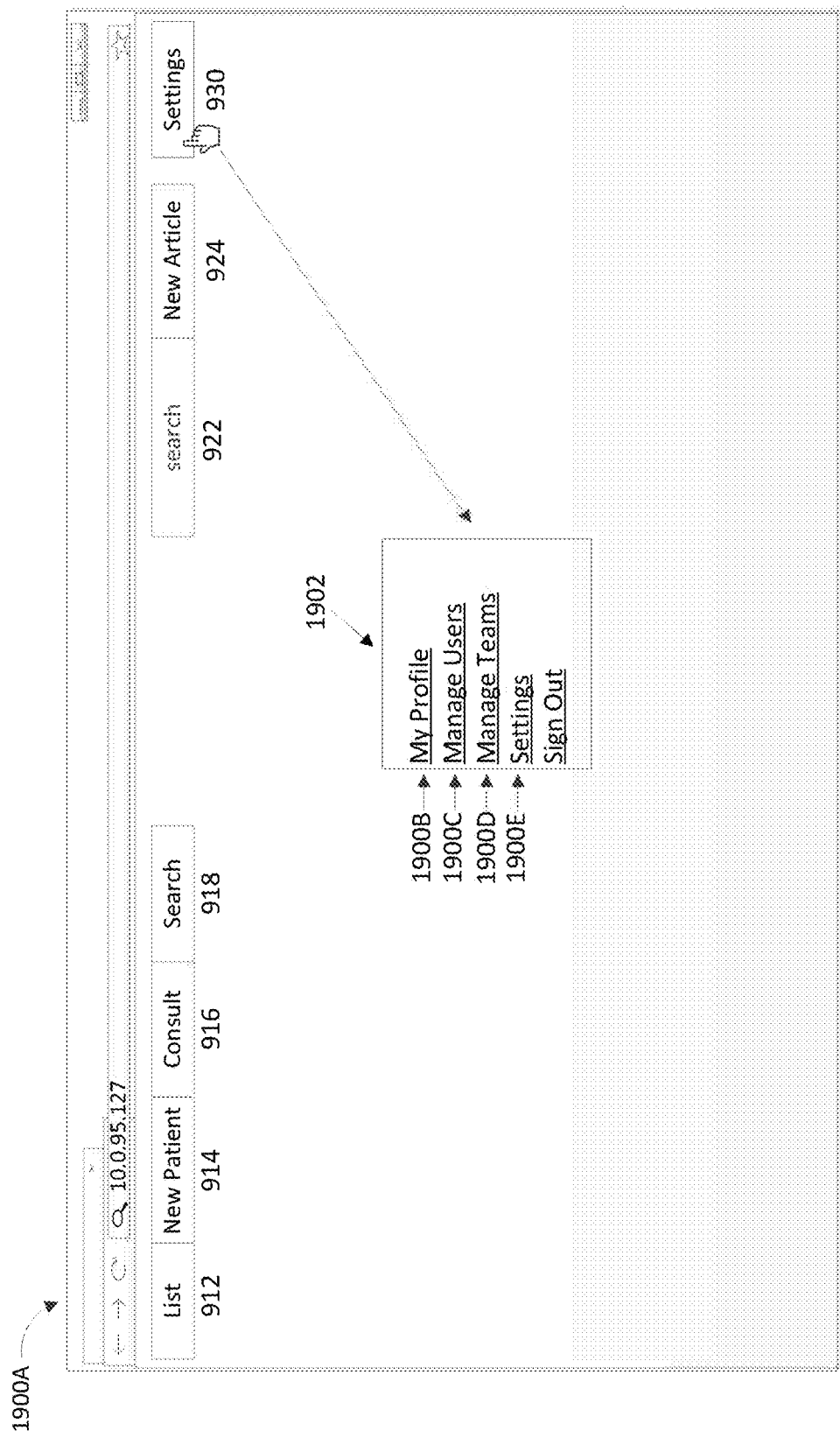

FIG. 19A illustrate interface 1900A for displaying and changing settings of the data sharing system according to some embodiments. Interface 1900A can be displayed by selecting or clicking the button 930. Settings menu 1902 is displayed. User profile can be changed via selecting menu item 1900B ("My Profile"), which can bring up interface 1900B of FIG. 19B. Team membership can be assigned or modified via selecting or clicking the button 1914, which can bring up another interface listing the available teams and providing choices to approve the user for team membership, assign role to the user (e.g., user or administrator), and to remove the user from team membership. User credentials (e.g., password) can be changed via button 1916. List 1920 provides fields for modifying user information, such as photo, username, first and last names, department, title, contact number, email, etc. Changes can be saved via button 1912. In some embodiments, an administrator (e.g., user who is running the data sharing system) can create one or more remote user profiles. Remote users who are granted administrator privileges (e.g., for one or more teams) can add other remote users.

Figure 19C:
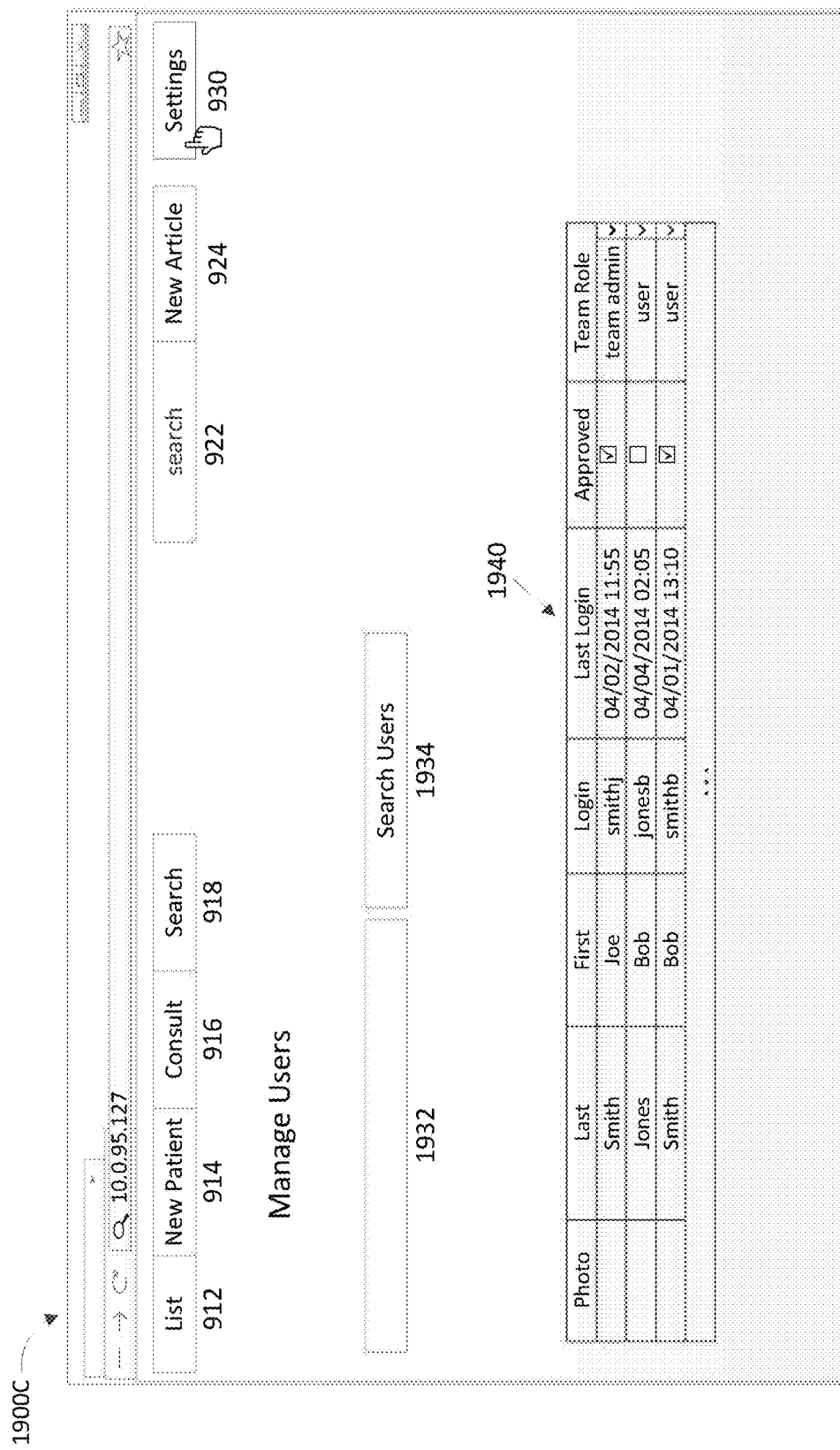
Figure 19D:
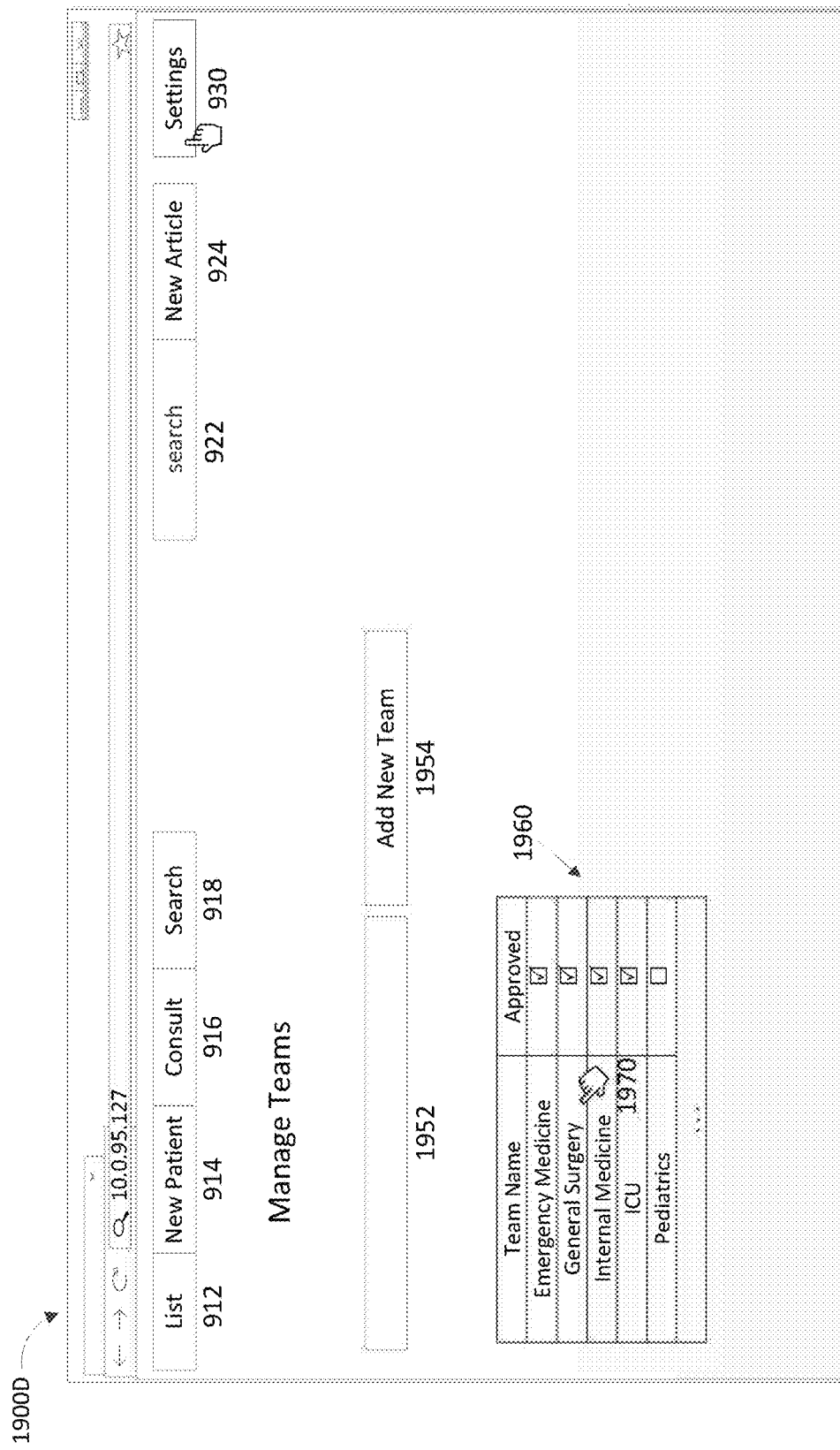

FIG. 19C illustrates interface 1900C for managing users. Users can be located via search box 1932 and search button 1934. The list of users is displayed in 1940. Attributes of any user from the list can be modified. In some embodiments, the interface 1900C is similar to the interface 1100 for managing team members. FIG. 19D illustrates interface 1900D for managing teams. New teams can be added via box 1952 and button 1954. List 1960 displays existing teams. As is illustrated, teams may be approved or disapproved from viewing or editing data. Selecting any of the teams (e.g., via mouse click illustrated as 1970) can bring up the interface 1000 for modifying team settings.

Figure 19E:
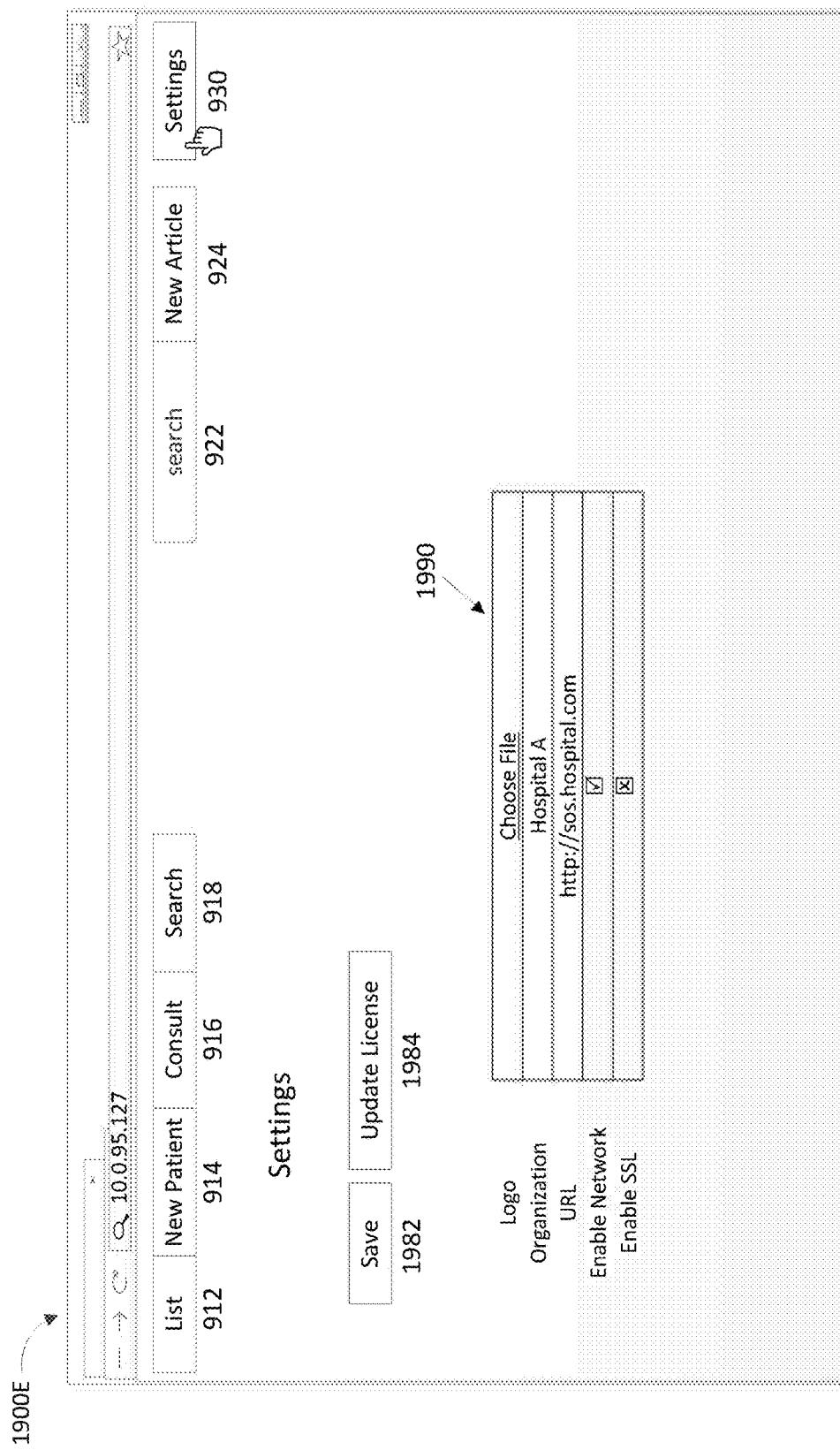

FIG. 19E illustrates interface 1900E for changing settings or parameters of the data sharing system. License can be updated via button 1984. Changes can be made by manipulating fields for the list 1990. For example, network can be enabled by selecting the illustrated checkbox, which allows remote users to join the data sharing system. As another example, security can be set-up via selecting the illustrated checkbox and providing additional information (e.g., SSL certificate and key). As yet another example, name of organization (e.g., hospital), logo, and address of the data sharing system can be changed. Changes can be saved via button 1982. Additional elements can be displayed in the interfaces 1900A, 1900B, 1900C, 1900D, and 1900E. Other user interface elements can be used in addition to or instead of the illustrated elements.

In certain embodiments, a list of authorized users with select portions of their personal profiles is maintained. The list can be accessible by authorized individuals having administrative privileges. The list can be accessible and viewable by a data sharing system administrator (either the administrative user or any user delegated administrative power) using a web browser. Administrator can have the greatest level of access and control over this list and can activate or deactivate authorized access to system by any authorized user at any time. Administrator further can select users from this list to act as a secondary administrator (e.g., "team leader"), delegating limited administrative power to the team leader. The team leader can have limited access to the user list and may select within that list any number of users to become members within their team. Essentially, limitless teams of users may be created by any user acting as an administrator or team lead. For example, a patient list belonging to the Trauma team or department may be accessed and manipulated only by users or members within the Trauma team even though any user that has joined the data sharing system may view ongoing work conducted within the Trauma team at any given time. This can help to protect and secure integrity of information between departments.

In various embodiments, team leader has the ability to define the function and role of the team by first naming the team and secondly choosing the relevant topical patient data entry fields (e.g., see FIG. 10). Since different teams within a treatment facility may care for a patient in different ways, the fields for data entry may differ. Team leaders can choose among preconfigured options as a way of tailoring to fit a team's relevant role while still maintaining continuity of data stored by the data sharing system despite different team entries.

In some embodiments, any team leader may select among the user list a tertiary team leader to act on his or her behalf with the same power to select team members and create new team leaders within that given team. It may be possible to have multiple levels of team leaders within a particular team, wherein each team leader has the ability to select or remove team members within their respective teams or groups. Users of the data sharing system may divide access to information to defined teams of users and may have the autonomy to further organize among themselves specific teams for specialized data sharing needs.

In certain embodiments, web interface is used to access shared data. The interface can have preconfigured entry fields for receiving, formatting (e.g., automatically to encode security features), and organizing new information for sharing. Information may be stored in a database. The received and saved information can be stored chronologically within the database and may be accessed for review at any moment from any location by any authorized local or remote user. Continuous real-time or near real-time collection of data, such as patient or client data, is cultivated. Teams of users may share data with each other in a highly secured manner and in complex multi-level groups wherein the ability to manipulate patient data may be limited only to those within a specific team. This may lead to reduction of mistakes, particularly in larger facilities where mistakes may occur in the entry of information by incorrect individual or to the incorrect patient profile. Here, only the most relevant caregivers may be authorized to manipulate and enter patient data within a defined list of patients. Patient data may therefore be updated only by authorized individuals. As a result, continuity and accuracy can be reinforced.

In some embodiments, an administrative user of a first data sharing system may be invited as an authorized secondary user of a second unrelated data sharing system. Since access can be based on matching identifiers and security code, users of the second system would not be able to view information shared within the first system unless invited and authorized by the administrative user of the first system. Since secondary users of the first system may not have control or possession over the data sharing service and database, they would may not have the power to merge data between first and second systems. The ability to merge data may require administrative control over each system. Two administrative users who are members of each other's systems may both have each other's identifier and security code to allow for automatic secured access of each other's systems. Reciprocal access at the administrative level enables manipulation and sharing of data. Therefore, administrative users of any given system can have the ability to create broader more complicated unions of data sharing systems.

In certain embodiments, communication of patient data between a medical clinic, a hospital's emergency department, and a mobile ambulance during the treatment of a patient who was injured remotely can be seamlessly achieved. Real-time or near real-time communication by instant messaging between the ambulance and the two facilities can be achieved. Requests can be made to facilities for access to patient records and direct updates to the records can be made.

CONCLUSION

Disclosed embodiments allow anyone to privately share confidential information over a network (or networks) directly with intended parties using a software-only solution without resorting to third-party service providers. Anyone with a personal computing device can instantly facilitate team collaboration via a web browser frontend with an encrypted database backend that is cross-platform compatible. For example, a user can organize and save data on a Mac computer, then simply move the directory in which data files are stored to a PC computer and be able to seamlessly access and edit the data. Accordingly, a cross-platform system that facilitates editing, searching, and organizing information on any personal computing device is provided. Any information can be shared via ad hoc secure private network, such as medical data, legal data, files, and the like.

Difficulties associated with existing patient hand off procedures within departments of a hospital or medical treatment facility can be solved by utilizing disclosed embodiments. While currently, access to ongoing patient lists may be limited to on-call teams and the exchange of patient lists may occurs over transitional hours between team shifts, disclosed embodiments allow access to information at any time to authorized team member from any location. For example, in the context of critical medical record transfer between shifts treatment teams within a particular department of a medical treatment facility, suppose that a patient list containing ten ongoing patients undergoing treatment within the trauma center of a hospital may have to be passed between two or more sets of treatment teams. Each team can include at least four or more treatment professionals. Physical handoff of paper and electronic documents would occur between teams during change of work shifts. Typically, only one team member is tasked with the job of updating patient records. Updates are often accomplished some period of time after the administration of care. Not every member of a team would have contemporaneous access to said list nor may anyone outside of the physical location of the trauma room have similar access. This lack of contemporaneous and immediate access can lead to substantial gaps in patient records, thereby creating a risk of inaccurate or erroneous medical treatment. Using disclosed embodiments can allow all team members to contemporaneously and instantaneously access patient information via a computing device. Each member can easily update patient care information as treatment is taking place. A handoff process may be similarly improved between doctors within private practice who are members of a call group for back up patient care. Real-time or near real-time work flow can achieved in a high paced treatment setting and continuity of information can be maintained.

Disclosed embodiments may be used for sharing any data, including any area within the practice of medicine such as patient treatment, billing, accounting, and medical research. Disclosed embodiments may be used for sharing legal, accounting, scientific, or any client data. Further, personal data, including social and entertainment data, can be shared seamlessly with others.

Many other variations than those described herein will be apparent from this disclosure. For example, depending on the embodiment, certain components, modules, acts, events, or functions of any of the systems or processes described herein can be combined or performed in a different sequence, can be added, merged, or left out altogether (e.g., not all described components, acts, or events are necessary for the practice of the systems or methods). Moreover, in certain embodiments, at least some acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative blocks, modules, and process steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The various illustrative blocks and modules described in connection with the embodiments disclosed herein may be implemented or performed by a hardware machine comprising logic circuitry, such as a general purpose processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be a processor, controller, microcontroller, or state machine, combinations of the same, or the like. A processor may also be implemented as a combination of computing devices, e.g., a plurality of microprocessors, etc.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the systems or processes illustrated may be made without departing from the spirit of the disclosure. As will be recognized, certain embodiments described herein may be embodied within a form that does not provide all of the features and benefits set forth herein, as some features may be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for facilitating ad hoc collaboration, review, and accurate sharing between team members, the system comprising a first computing device including at least one memory device and at least one processor, wherein
    the at least one memory device is configured to store ad hoc network instructions; and
    the at least one processor being configured to:
        execute a first operating system having configuration parameters,
        execute an ad hoc data sharing network by at least receiving and executing the ad hoc network instructions without altering any configuration parameters of the first operating system and without altering any configuration parameters of an application program being executed by the at least one processor, the ad hoc data sharing network being configured so that the at least one processor operates as a web server, the ad hoc data sharing network being configured to be executed irrespective of which of a plurality of different operating systems including the first operating system that the at least one processor is executing, responsive to executing the ad hoc network instructions, determine that a database does not exist for use with the ad hoc data sharing network, the database being configured to store data in encrypted form, responsive to determining that the database does not exist for use with the ad hoc data sharing network, automatically generate and execute the database without altering any configuration parameters of the first operating system, execute a web browser, receive a user input from a user of the first computing device via the web browser, the user input indicating to adjust a configuration setting for the ad hoc data sharing network, the configuration setting being configured to control whether access to the ad hoc data sharing network is limited to the first computing device or open to computing devices other than the first computing device, adjust the configuration setting according to the user input, receive a plurality of requests from a first plurality of remote users of a plurality of second computing devices to join the ad hoc data sharing network, permit at least some of a second plurality of remote users to join the ad hoc data sharing network responsive to the plurality of requests, the ad hoc data sharing network connecting a plurality of users that includes the user of the first computing device and the second plurality of remote users, the second plurality of remote users comprising a subset of the first plurality of remote users, initiate and maintain communication with the plurality of second computing devices via the ad hoc data sharing network without the at least one processor initiating installation of a software on the plurality of second computing devices, provide, via the ad hoc data sharing network, the data to the plurality of second computing devices to cause presentation of associated information to the second plurality of remote users in web browsers being executed by the plurality of second computing devices, update the data to thereby obtain updated data responsive to receiving, via the ad hoc data sharing network, a request from a user of the second plurality of remote users to modify at least part of the data provided to the plurality of second computing devices, and provide, via the ad hoc data sharing network, the updated data to the plurality of second computing devices to cause presentation of updated associated information to the second plurality of remote users in place of the associated information presented to the second plurality of remote users in the web browsers being executed by the plurality of second computing devices, wherein the updated data is provided substantially in real-time with receiving the request from the user of the second plurality of remote users to modify at least part of the data provided to the plurality of second computing devices.

2. The system of claim 1, wherein the data provided to the plurality of second computing devices comprises patient data that includes one or more of a patient identification, a diagnosis, a treatment plan, or a treatment protocol, and the associated information comprises the data provided to the plurality of second computing devices.

3. The system of claim 2, wherein the patient data comprises a plurality of treatment protocols associated with treating a plurality of medical conditions.

4. The system of claim 1, wherein the plurality of different operating systems comprises a Windows operating system, a MacOS™ operating system, and a Linux™ operating system.

5. The system of claim 4, wherein the first operating system comprises the Windows operating system.

6. The system of claim 4, wherein the first operating system comprises the MacOS™ operating system.

7. The system of claim 4, wherein the first operating system comprises the Linux™ operating system.

8. The system of claim 1, wherein the at least one processor is configured to:

responsive to executing the ad hoc network instructions for a first time, automatically assign an identifier and an encryption code to the first computing device, provide, via the ad hoc data sharing network, the identifier and the encryption code to the plurality of second computing devices, and associate the identifier and the encryption code with the updated data.

9. The system of claim 1, wherein the first computing device is a smartphone.

10. The system of claim 1, wherein the at least one processor is configured to communicate with at least some of the plurality of second computing devices over an encrypted network and execute the encrypted network based at least on SSL data provided by the user of the first computing device.

11. A non-transitory computer readable medium comprising executable instructions that, when executed on a first computing device comprising at least one processor executing first operating system having configuration parameters, cause the at least one processor to:

execute an ad hoc data sharing network by at least receiving and executing ad hoc network instructions without altering any configuration parameters of the first operating system and without altering any configuration parameters of an application program being executed by the at least one processor, the ad hoc data sharing network being configured so that the at least one processor operates as a web server, the ad hoc data sharing network being configured to be executed irrespective of which of a plurality of different operating systems including the first operating system that the at least one processor is executing;

responsive to executing the ad hoc network instructions, determine that a database does not exist for use with the ad hoc data sharing network, the database being configured to store data in encrypted form;

responsive to determining that the database does not exist for use with the ad hoc data sharing network, automatically generate and execute the database without altering any configuration parameters of the first operating system;

execute a web browser;

receive a user input from a user of the first computing device via the web browser, the user input indicating to adjust a configuration setting for the ad hoc data sharing network, the configuration setting being configured to control whether access to the ad hoc data sharing network is limited to the first computing device or open to computing devices other than the first computing device;
adjust the configuration setting according to the user input;
receive a plurality of requests from a first plurality of remote users of a plurality of second computing devices to join the ad hoc data sharing network;
permit at least some of a second plurality of remote users to join the ad hoc data sharing network responsive to the plurality of requests, the ad hoc data sharing network connecting a plurality of users that includes the user of the first computing device and the second plurality of remote users, the second plurality of remote users comprising a subset of the first plurality of remote users;
initiate and maintain communication with the plurality of second computing devices via the ad hoc data sharing network without the at least one processor initiating installation of a software on the plurality of second computing devices;
provide, via the ad hoc data sharing network, the data to the plurality of second computing devices to cause presentation of associated information to the second plurality of remote users in web browsers being executed by the plurality of second computing devices;
update the data to thereby obtain updated data responsive to receiving, via the ad hoc data sharing network, a request from a user of the second plurality of remote users to modify at least part of the data provided to the plurality of second computing devices; and
provide, via the ad hoc data sharing network, the updated data to the plurality of second computing devices to cause presentation of updated associated information to the second plurality of remote users in place of the associated information presented to the second plurality of remote users in the web browsers being executed by the plurality of second computing devices, wherein the updated data is provided substantially in real-time with receiving the request from the user of the second plurality of remote users to modify at least part of the data provided to the plurality of second computing devices.

12. The non-transitory computer readable medium of claim 11, wherein upon execution, the executable instructions cause the at least one processor to initiate and maintain communication with the plurality of second computing devices via the ad hoc data sharing network without the at least one processor transmitting data associated with desktop virtualization.

13. The non-transitory computer readable medium of claim 11, wherein the plurality of different operating systems comprises a Windows operating system, a MacOS™ operating system, and a Linux™ operating system.

14. The non-transitory computer readable medium of claim 11, wherein, responsive to receiving a search request via the ad hoc data sharing network for data of interest from another user of the second plurality of remote users, the executable instructions, upon execution, cause the at least one processor to:
search the data for the data of interest; and
transmit via the ad hoc data sharing network at least a portion of located data comprising the data of interest to the another user.

15. The non-transitory computer readable medium of claim 11, wherein the non-transitory computer readable medium is part of a flash drive.

16. A computer-implemented method for facilitating ad hoc collaboration, review, and accurate sharing between team members, the computer-implemented method being performed by at least one processor of a first computing device, the computer-implemented method comprising:
executing a first operating system having configuration parameters;
executing an ad hoc data sharing network by at least receiving and executing ad hoc network instructions without altering any configuration parameters of the first operating system and without altering any configuration parameters of an application program being executed by the at least one processor, the ad hoc data sharing network being configured so that the at least one processor operates as a web server, the ad hoc data sharing network being configured to be executed irrespective of which of a plurality of different operating systems including the first operating system that the at least one processor is executing;
in response to executing the ad hoc network instructions, determining that a database does not exist for use with the ad hoc data sharing network, the database being configured to store data in encrypted form;
in response to determining that the database does not exist for use with the ad hoc data sharing network, automatically generating and executing the database without altering any configuration parameters of the first operating system;
executing a web browser;
receiving a user input from a user of the first computing device via the web browser, the user input indicating to adjust a configuration setting for the ad hoc data sharing network, the configuration setting being configured to control whether access to the ad hoc data sharing network is limited to the first computing device or open to computing devices other than the first computing device;
adjusting the configuration setting according to the user input;
receiving a plurality of requests from a first plurality of remote users of a plurality of second computing devices to join the ad hoc data sharing network;
permitting at least some of a second plurality of remote users to join the ad hoc data sharing network responsive to the plurality of requests, the ad hoc data sharing network connecting a plurality of users that includes the user of the first computing device and the second plurality of remote users, the second plurality of remote users comprising a subset of the first plurality of remote users;
initiating and maintaining communication with the plurality of second computing devices via the ad hoc data sharing network without the at least one processor initiating installation of a software on the plurality of second computing devices;
providing, via the ad hoc data sharing network, the data to the plurality of second computing devices to cause presentation of associated information to the second plurality of remote users in web browsers being executed by the plurality of second computing devices;
updating the data to thereby obtain updated data in response to receiving, via the ad hoc data sharing network, a request from a user of the second plurality of remote users to modify at least part of the data provided to the plurality of second computing devices; and providing, via the ad hoc data sharing network, the updated data to the plurality of second computing devices to cause presentation of updated associated information to the second plurality of remote users in place of the associated information presented to the second plurality of remote users in the web browsers being executed by the plurality of second computing devices, wherein the updated data is provided substantially in real-time with receiving the request from the user of the second plurality of remote users to modify at least part of the data provided to the plurality of second computing devices.

17. The computer-implemented method of claim 16, wherein the data provided to the plurality of second computing devices comprises patient data that includes a plurality of treatment protocols associated with treating a plurality of medical conditions, as well as one or more of a patient identification, a diagnosis, or a treatment plan.

18. The computer-implemented method of claim 16, wherein the plurality of different operating systems comprises a Windows operating system, a MacOS™ operating system, and a Linux™ operating system, and the first operating system comprises the Windows operating system, the MacOS™ operating system, or the Linux™ operating system.

19. The computer-implemented method of claim 16, further comprising:

in response to executing the ad hoc network instructions for a first time, automatically assigning an identifier and an encryption code to the first computing device;

providing, via the ad hoc data sharing network, the identifier and the encryption code to the plurality of second computing devices; and associating the identifier and the encryption code with the updated data.

20. The computer-implemented method of claim 16, wherein the first computing device is a smartphone.

\* \* \* \* \*